(12) United States Patent
Ohashi

(10) Patent No.: US 7,388,917 B2
(45) Date of Patent: Jun. 17, 2008

(54) IMAGE-PROCESSING METHOD AND IMAGE PROCESSOR

(75) Inventor: Masahiro Ohashi, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 738 days.

(21) Appl. No.: 10/690,562

(22) Filed: Oct. 23, 2003

(65) Prior Publication Data

US 2004/0109505 A1 Jun. 10, 2004

(30) Foreign Application Priority Data

Oct. 25, 2002 (JP) ............................. 2002-310853

(51) Int. Cl.
*H04N 7/18* (2006.01)
(52) U.S. Cl. ............................. 375/240.29; 375/240.26
(58) Field of Classification Search ............................. 375/240.01–240.29
See application file for complete search history.

(56) References Cited

U.S. PATENT DOCUMENTS 5,974,521 A * 10/1999 Akerib ........................ 712/11
6,996,179 B2 * 2/2006 Rovati et al. ........... 375/240.16

FOREIGN PATENT DOCUMENTS

| JP | 06-054311 | 2/1994 |
|----|-----------|--------|
| JP | 06-343169 | 12/1994 |
| JP | 07-007732 | 1/1995 |
| JP | 08-065525 | 3/1996 |
| JP | 08-214303 | 8/1996 |
| JP | 11-027563 | 1/1999 |

\* cited by examiner

*Primary Examiner*—Andy S Rao
(74) *Attorney, Agent, or Firm*—Wenderoth, Lind & Ponack, L.L.P.

(57) ABSTRACT

Image data is separated from three lines of image data in accordance with a storage capacity of a source memory. The separated image data is transferred to the source memory, Several pieces of image data are read out in sequence from the transferred image data and forwarded to a filtering process. These operations are then repeated to provide a line of filtered image data.

5 Claims, 28 Drawing Sheets

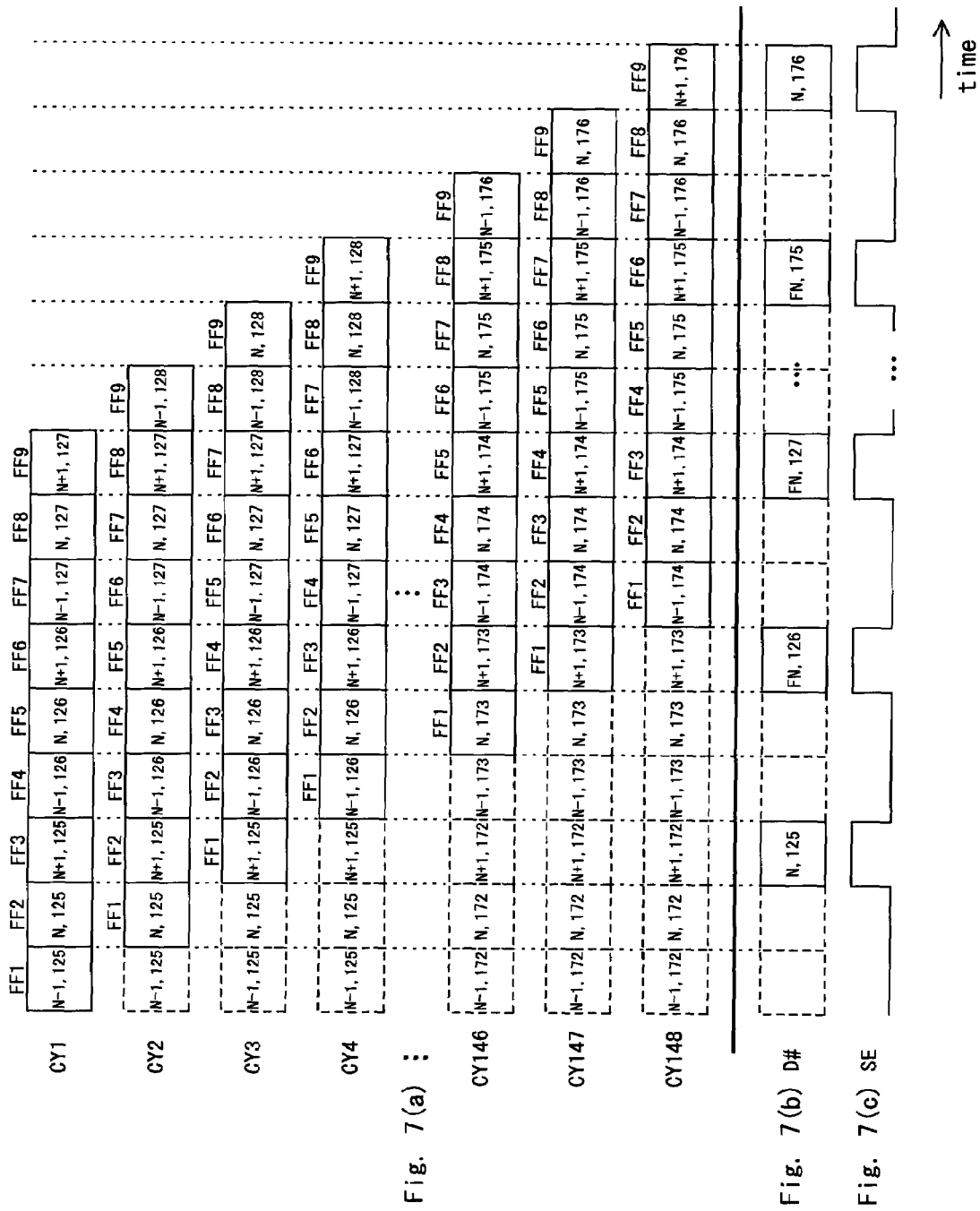

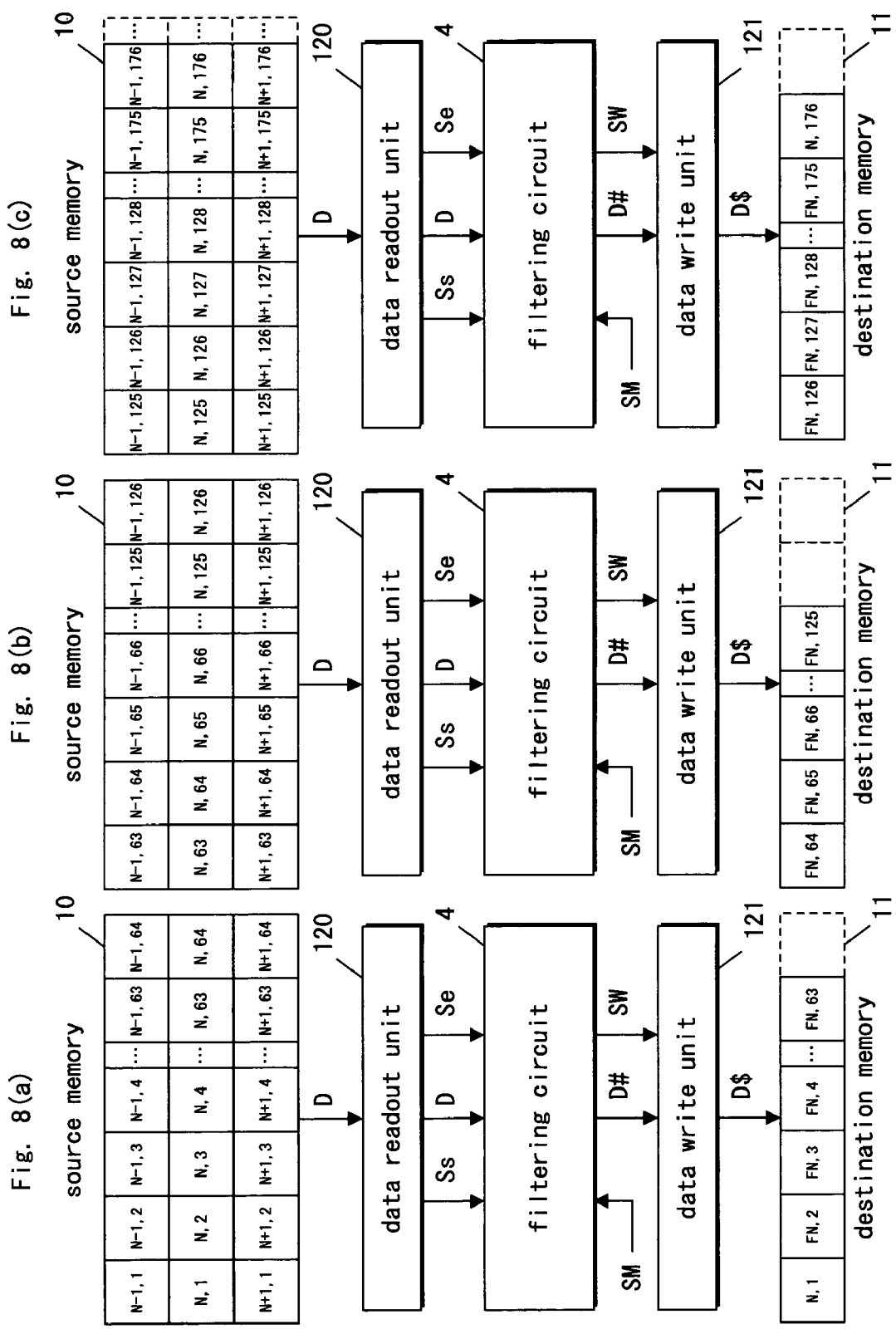

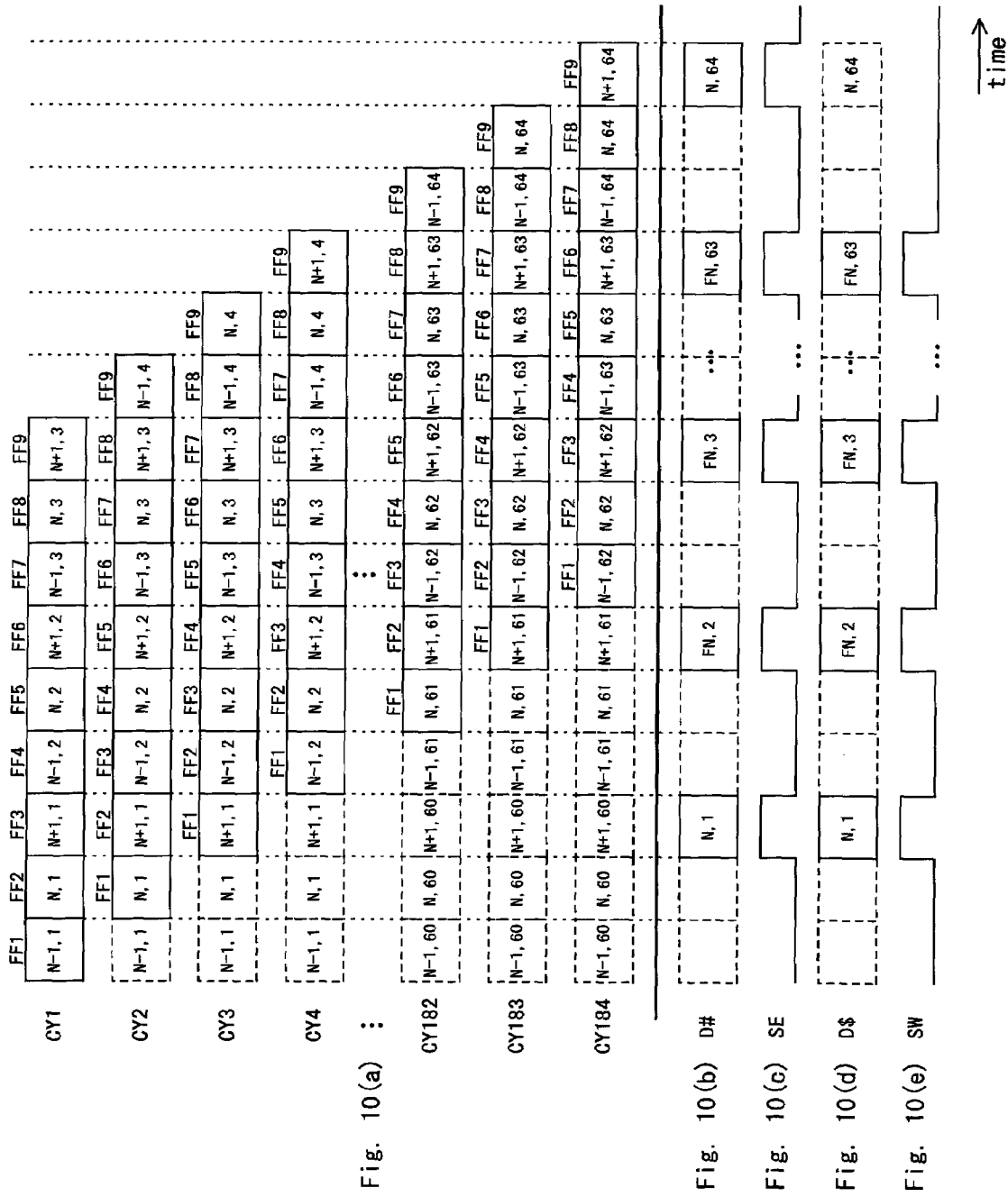

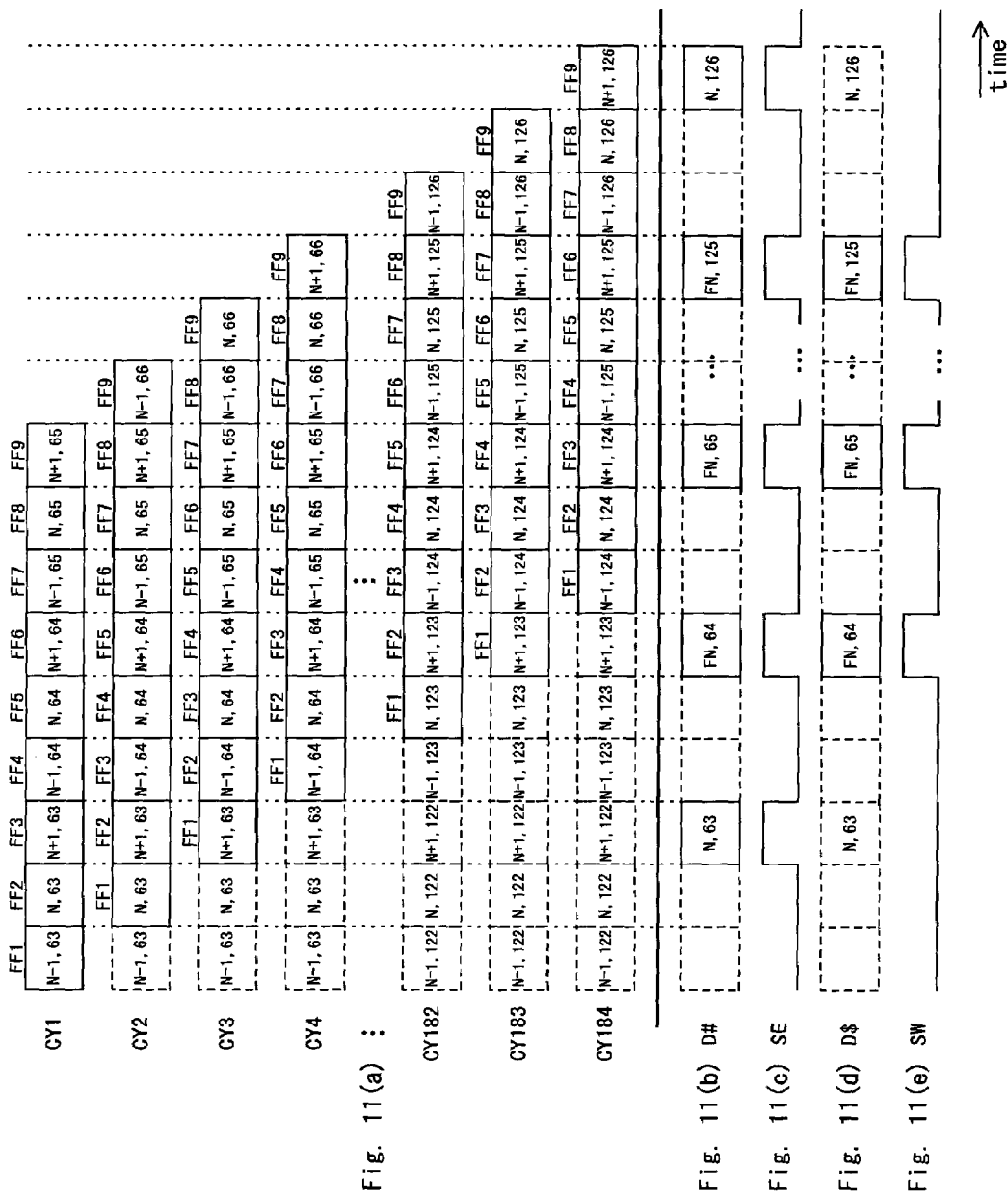

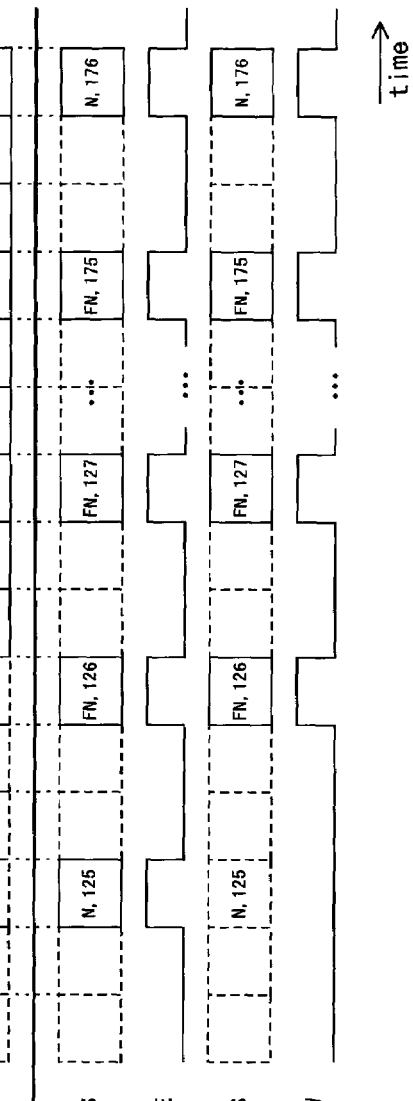

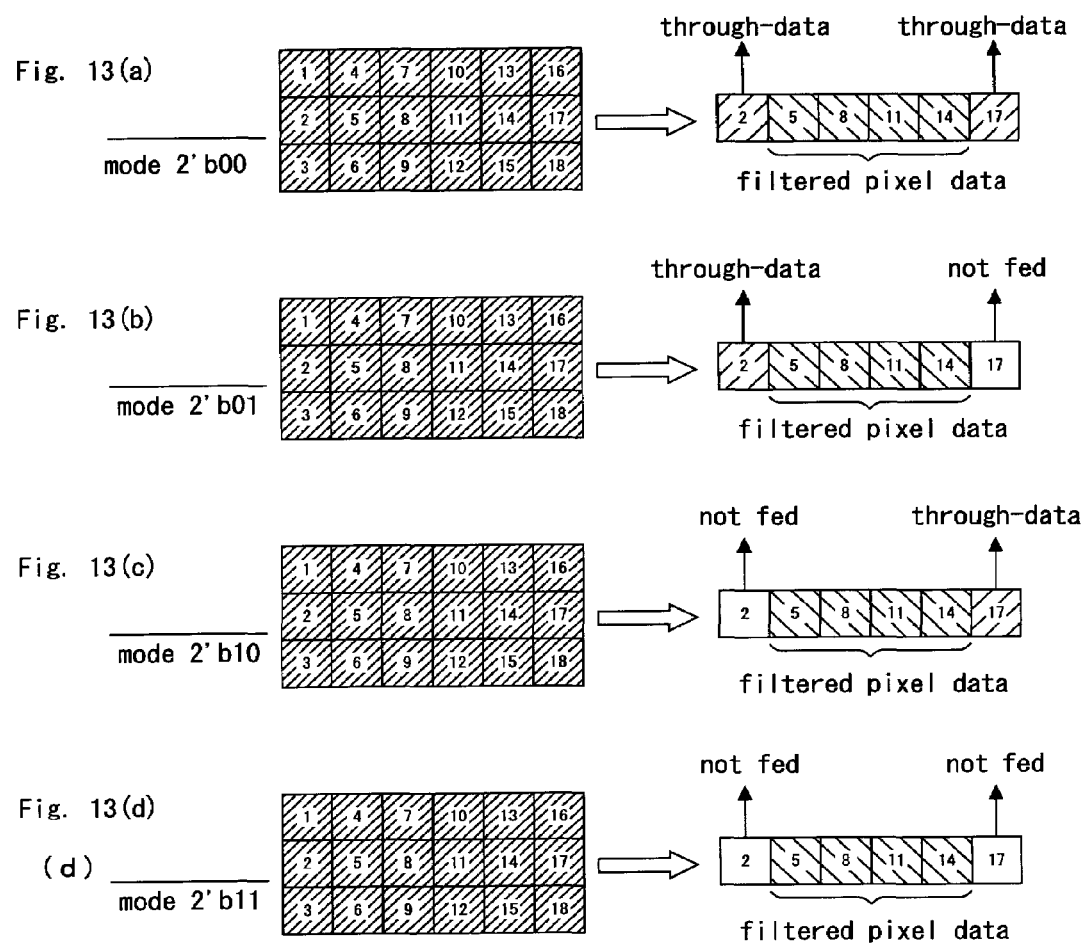

(a) _____
mode 2'b01

(b) _____
mode 2'b11

(c) _____
mode 2'b10

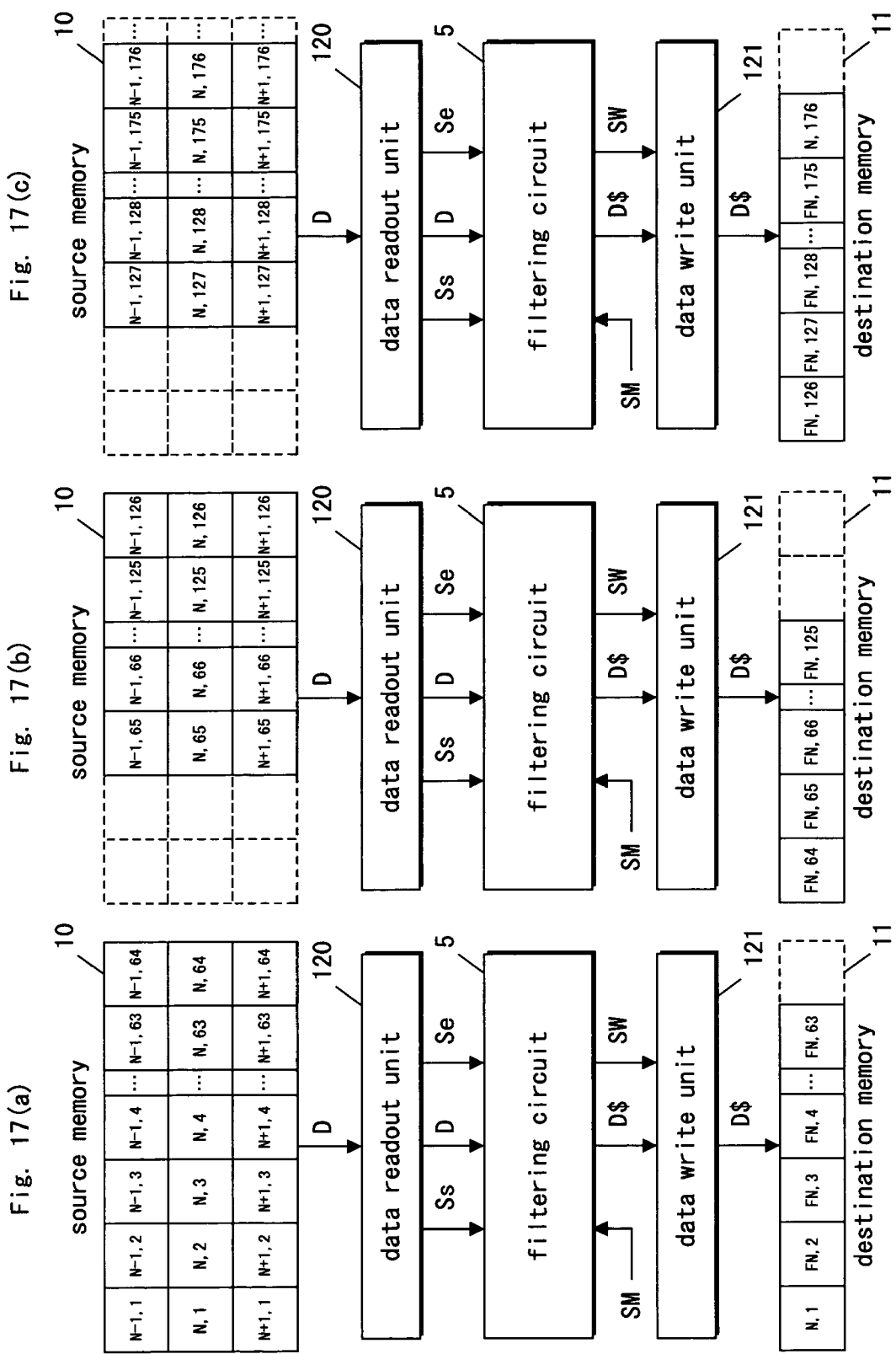

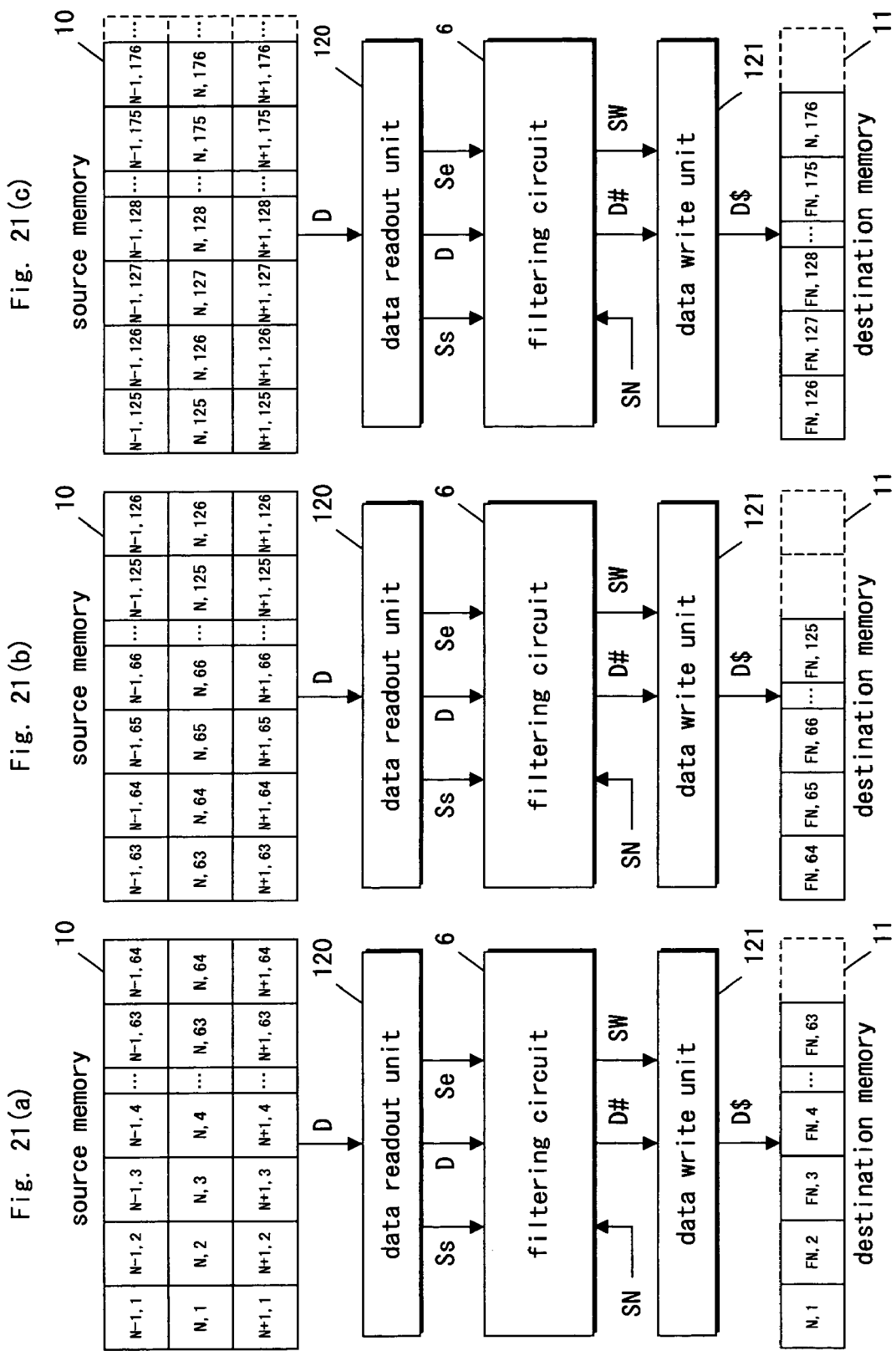

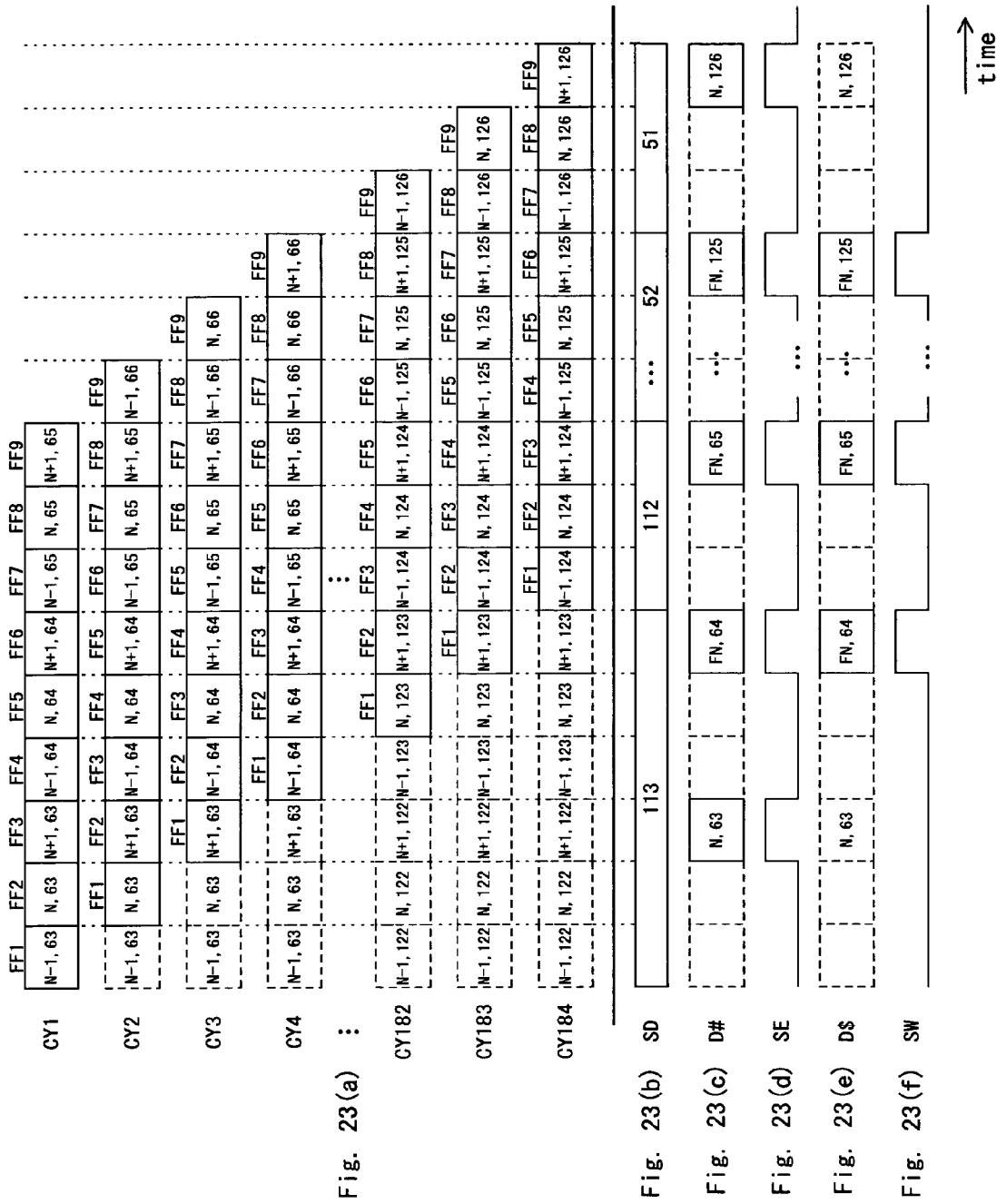

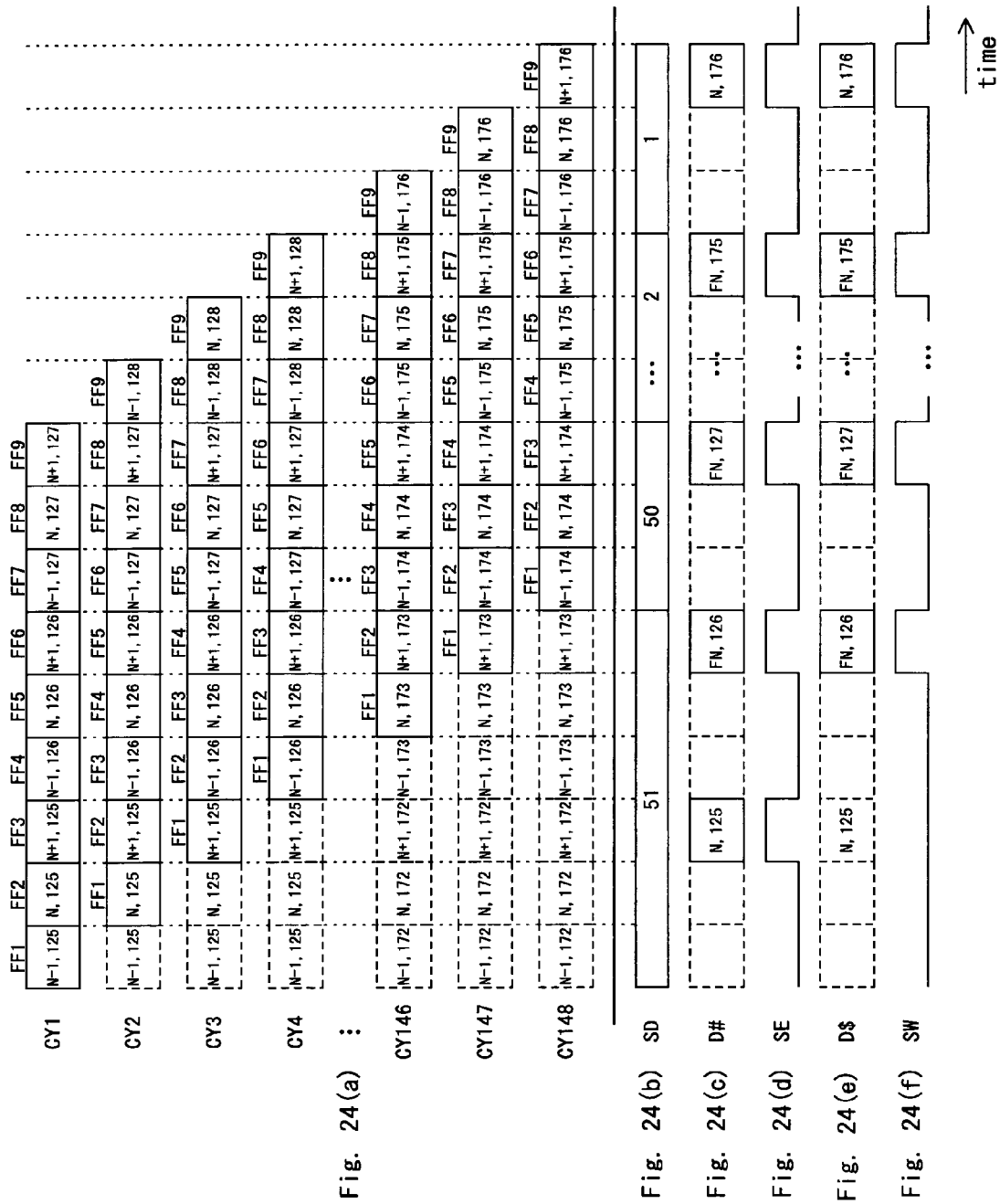

IMAGE-PROCESSING METHOD AND IMAGE PROCESSOR

BACKGROUND OF THE INVENTION

1. Field of the Invention

The present invention relates to an image-processing method and image processor for filtering image data to operatively remove encoding-caused noises.

2. Description of the Related Art

Encoded and decoded images over a videophone and a TV conference have heretofore been used to provide a reduced amount of image information in order to achieve efficient image transmission.

A majority of such an image encoding-decoding method in recent years uses discrete cosine transform.

The discrete cosine transform achieves a substantial reduction in image information amount. At the same time, the discrete cosine transform brings up a problem of peculiar Gaussian noise called a mosquito noise. The noise appears on a decoded image, and spoils subjective image quality.

The Gaussian noise as represented by the mosquito noise is removable using a spatial filter. The spatial filter functions to remove high-frequency components.

The following specifically discusses filtering, in which image data having a QCIF (quarter common intermediate format) size (144 lines by 176 pixels) is filtered as an illustration. Each gang of three-pixels-by-three-pixels image data is filtered. A pixel located at the center of three pixels-by-three pixels has target image data subject to filtering.

FIG. 25 is a block diagram illustrating a prior art image processor designed to filter target image data subject to filtering.

As shown in FIG. 25, the prior art image processor includes a processor 500, an image memory 501, line buffers 502 and 504, and a filtering circuit 503.

The processor 500 includes a source memory 505 and a destination memory 506.

The processor 500 reads out encoded image data from the image memory 501 and writes the same encoded image data into the source memory 505.

The processor 500 decodes the encoded image data in the source memory 505.

The processor 500 at first stores the decoded image data into the destination memory 506, and then transfers the same image data to the image memory 501.

The decoded image data in the image memory 501 are filtered.

In order to filter the decoded image data, 3-lines-by-176-pixels image data are transmitted to the line buffer 502 from the image memory 501.

The line buffer 502 stores the transmitted 3-lines-by-176-pixels image data.

The filtering circuit 503 reads out the three pixels-by-three pixels image data from the line buffer 502 to filter a piece of target image data subject to filtering.

The filtering circuit 503 repeats the above steps, thereby filtering 174-pieces of target image data subject to filtering that are stored in the line buffer 502.

Image data located in a central line of 3-lines-by-176-pixels (except for image data at opposite ends of the central line) among the 3-lines-by-176-pixels image data in the line buffer 502 are target image data subject to filtering.

The filtering circuit 503 feeds the filtered 174-pieces of image data into the line buffer 504.

At the same time, the filtering circuit 503 feeds the image data at opposite ends of the central line as previously discussed into the line buffer 504 without filtering them.

As a result, the line buffer 504 stores a line (176-pieces) of filtered image data.

As discussed above, the past practice is to transmit the image data to the line buffer 502 for each gang of 3-lines-by-176-pixels, thereby filtering the QCIF-sized image data.

Details of the filtering are now discussed.

FIG. 26 is a block diagram illustrating the filtering circuit 503 as shown in FIG. 25. FIG. 26 illustrates the same reference characters on the same components as those shown in FIG. 25.

As shown in FIG. 26, the filtering circuit 503 includes a data readout unit 507, a filtering unit 508, and a data write unit 509.

As shown in FIG. 26, assume that the line buffer 502 is designed to store the 3-lines-by-176-pixels image data at maximum.

The data readout unit 507 reads out image data from the line buffer 502.

The filtering unit 508 filters the read image data.

The data write unit 509 writes the filtered image data to the line buffer 504.

The line buffer 504 is constructed to store a line (176-pixels) of image data at maximum.

The prior art image processor repeats the following steps: the data readout unit 507 reads out three-pixels-by-three-pixels image data from the line buffer 502; the filtering unit 508 filters the read three pixels-by-three pixels image data; and the data write unit 509 writes a pixel to the line buffer 504.

The following discusses the filtering with reference to a specific example.

FIG. 27 is a descriptive illustration showing how image data in "N"-line of a QCIF image are filtered in a conventional manner.

FIG. 28 is a descriptive illustration showing how image data in "N+1"-line of the QCIF image are filtered in a conventional manner.

As shown in FIG. 27, the data readout unit 507 reads out three-pixels-by-three-pixels image data 600 to perform the first filtering.

The filtering unit 508 filters image data (N, 2) using surrounding image data (N−1, 1), (N, 1) (N+1, 1), (N−1, 2), (N+1, 2), (N−1, 3), (N, 3) and (N+1, 3).

The data write unit 509 writes the filtered image data (FN, 2) to the line buffer 504.

The data readout unit 507 reads out three-pixels-by-three-pixels image data 601 to execute the second filtering.

The filtering unit 508 filters image data (N, 3) using surrounding image data (N−1, 2), (N, 2) (N+1, 2), (N−1, 3), (N+1, 3), (N−1, 4), (N, 4) and (N+1, 4).

The data write unit 509 writes the filtered image data (FN, 3) to the line buffer 504.

The above steps are repeated 174-times. As a result, the line buffer 504 stores "N"-line of image data (N, 1), (FN, 2) to (FN, 175), and (N, 176).

Upon completion of the filtering of the image data in "N"-line, image data in "N+1"-line are filtered, as shown in FIG. 28.

Deleting "N−1"-line, "N+2"-line is added as the last line.

In this way, lines to be filtered are selected in sequence to repeat the above steps.

In general, pixels at both ends of the central line where surrounding pixels are absent are not filtered. In addition, pixels in the first line as well as the 144th line are not filtered.

Accordingly, 142-lines-by-174-pixels image data are filtered. This means that separate steps must be taken to decode the QCIF image.

As previously discussed, filtering the image data using the prior art image processor requires one line buffer (the line buffer 502 according to the above example) adapted for plural lines (three lines according to the above example) and another line buffer (the line buffer 504 according to the above example) designed to store a line of filtered image data, in accordance with the number of pixels to be filtered at a time (three pixels-by-three pixels according to the above example). For details, refer to the published Japanese Patent Application Laid-Open No. 2000-251065.

Such a requirement causes a problem of an area increase in an image processor.

Another problem is that the image data are filtered in a lengthy time because each gang of three-pixels-by-three-pixels image data is read out, for each time of the filtering, from the line buffer 502 to repeat the above steps. For details, refer to the published Japanese Patent Application Laid-Open No. 7-111586.

Furthermore, in order to process edgewise pixels, only a predetermined number of pixels are processed.

This causes a further problem that a change in image size precludes the filtering of the image data.

OBJECTS AND SUMMARY OF THE INVENTION

In view of the above, an object of the present invention is to provide an image processor and image-processing method for inhibiting an area increase in an image processor, processing image data in a reduced time, and coping with a change in image size.

A first aspect of the present invention provides an image-processing method comprising: transferring image data to a storage unit, the image data being formed by several pieces of image data, the image data being separated from several lines of image data; sequentially reading out the several pieces of image data from the storage unit; and filtering target image data subject to filtering using predetermined pieces of the read image data.

The above method allows several lines of image data to be divided into partitions in accordance with the storage capacity of a destination or rather the storage unit in order to transfer the partitions to the storage unit. This feature eliminates a storage unit having large storage capacity sufficient to store the several lines of image data. Consequently, an area increase in an image processor is inhibited.

The above method allows an existing storage unit to be used as a destination. This feature eliminates a dedicated storage unit designed for filtering, which serves as a destination. Consequently, an area increase in an image processor is again inhibited.

The above method sequentially reads out several pieces of image data from the storage unit. This feature filters several pieces of target image data subject to filtering without reading out the same image data several times. As a result, the target image data subject to filtering can be filtered in a reduced time.

The above method makes it feasible to filter the target image data subject to filtering without fixing the number of pixels in a line. This feature filters the target image data subject to filtering independently of an image size.

A second aspect of the present invention is to provide an image-processing method comprising: sequentially entering several pieces of image data that are used to filter several pieces of target image data subject to filtering; shifting the sequentially entered several pieces of image data; parallel-feeding predetermined pieces of the shifted image data; and filtering the target image data subject to filtering using the parallel-fed predetermined pieces of the shifted image data.

The above method sequentially reads out several pieces of image data from the storage unit for use in filtering several pieces of target image data subject to filtering. This feature filters the several pieces of target image data subject to filtering without reading out the same image data several times. As a result, the target image data subject to filtering can be filtered in a shorter time.

A third aspect of the present invention is to provide an image processor comprising: a first storage unit operable to store image data formed by several pieces of image data, the image data being separated from several lines of image data; a data readout unit operable to sequentially read out the several pieces of image data stored by the first storage unit; a filtering unit operable to filter target image data subject to filtering using predetermined pieces of the image data read out from the data readout unit; a second storage unit operable to store the filtered target image data subject to filtering; and a data write unit operable to write the filtered target image data subject to filtering to the second storage unit.

The above image processor allows several lines of image data to be divided into partitions in accordance with the storage capacity of a destination or rather the first storage unit in order to transfer the partitions to the first storage unit. This feature eliminates a first storage unit having large storage capacity sufficient to store the several lines of image data.

The above image processor allows an existing storage unit to be used as a destination or rather the first storage unit. This feature eliminates a dedicated first storage unit designed for filtering, which serves as a destination.

The above image processor filters several pieces of target image data subject to filtering, which are included in image data separated from several lines of image data. This feature eliminates the need to provide a second storage unit having large storage capacity sufficient to store a line of image data.

The above image processor allows an existing storage unit to be used as the second storage unit where the image data are written. This feature eliminates the need to provide a dedicated second storage unit designed for filtering, to which the image data are written.

Consequently, the above features inhibit an area increase in an image processor.

The above image processor sequentially reads out several pieces of image data from the first storage unit. This feature filters several pieces of target image data subject to filtering without reading out the same image data several times. As a result, the target image data subject to filtering can be filtered in a reduced time.

The above image processor makes it feasible to filter the target image data subject to filtering without providing a fixed number of pixels in a line. This feature filters the target image data subject to filtering independently of an image size.

A fourth aspect of the present invention is to provide an image processor as defined in the third aspect of the present invention, wherein the filtering unit comprises a data output control unit operable to feed filtered target image data subject to filtering, but operable not to feed a predetermined piece of non-filtered image data in accordance with mode information.

According to the above image processor, the data output control unit removes unnecessary image data produced in the course of filtering the target image data subject to filtering. As a result, only the required image data are provided. This feature produces line data in a reduced time.

A fifth aspect of the present invention is to provide an image processor as defined in the third aspect of the present invention, wherein the filtering unit comprises a data output control unit operable to practice a countdown from an initial value each time when the image data is fed, the initial value being determined in accordance with the number of pixels to be processed, the data output control unit being operable to feed only a predetermined piece of non-filtered image data as well as filtered target image data subject to filtering in accordance with results from the countdown.

According to the above image processor, the data output control unit removes unnecessary image data produced in the course of filtering the target image data subject to filtering. As a result, only the required image data are provided. This feature produces line data in a reduced time. The above image processor initially sets up the number of pixels to be processed. Such a simple setup provides subsequent edgewise pixel processing. This feature allows edgewise pixel-processing information to be set up a smaller number of times.

A sixth aspect of the present invention is to provide an image processor as defined in the third aspect of the present invention, wherein the filtering unit comprises a image data-retaining unit operable to retain several pieces of image data for use at the time of the next filtering, the several pieces of image data for use at the time of the next filtering being selected from among several pieces of image data read out by the data readout unit from the first storage unit.

At the end of the present filtering, the above image processor retains image data required for the following filtering, thereby using the retained image data at the time of the following filtering. This feature allows the data to be transferred a smaller number of times.

Embodiments of the present invention exemplify a QCIF (quarter common intermediate format) size in which image data to be filtered consists of 144-lines-by-176-pixels.

In the 144-lines-by-176 pixels QCIF size, linearly aligned 176-pixels forms a line; and a plurality of the lines are arranged in parallel to form 144-lines, thereby providing an image plane.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3($b$) is an illustration showing a flow of the second filtering provided by the image processor according to the first embodiment;

FIG. 3($c$) is an illustration showing a flow of the third filtering provided by the image processor according to the first embodiment;

FIGS. 7($a$), 7($b$), and 7($c$) are descriptive illustration showing the third filtering provided by the image processor according to the third embodiment;

FIG. 8($a$) is an illustration showing a flow of the first filtering provided by an image processor according to a second embodiment;

FIG. 8($b$) is an illustration showing a flow of the second filtering provided by the image processor according to the second embodiment;

FIG. 8($c$) is an illustration showing a flow of the third filtering provided by the image processor according to the second embodiment;

FIGS. 10($a$), 10($b$), 10($c$), 10($d$), and 10($e$) are descriptive illustrations showing the first filtering provided by the image processor according to the second embodiment;

FIGS. 11($a$), 11($b$), 11($c$), 11($d$), and 11($e$) are descriptive illustrations showing the first filtering provided by the image processor according to the second embodiment;

FIGS. 12($a$), 12($b$), 12($c$), 12($d$), and 12($e$) are descriptive illustrations showing the third filtering provided by the image processor according to the second embodiment;

FIG. 13($a$) is a descriptive illustration showing mode information 2'$b$00 in the image processor according to the second embodiment;

FIG. 13($b$) is a descriptive illustration showing mode information 2'$b$01 in the image processor according to the second embodiment;

FIG. 13($c$) is a descriptive illustration showing mode information 2'$b$10 in the image processor according to the second embodiment;

FIG. 13($d$) is a descriptive illustration showing mode information 2'$b$11 in the image processor according to the second embodiment;

FIG. 14($b$) is a descriptive illustration showing the usage of mode information 2'$b$11 in the image processor according to the second embodiment;

FIG. 14($c$) is a descriptive illustration showing the usage of mode information 2'$b$10 in the image processor according to the second embodiment;

FIG. 17($a$) is an illustration showing a flow of the first filtering provided by the image processor according to the third embodiment;

FIG. 17($b$) is an illustration showing a flow of the second filtering provided by the image processor according to the third embodiment;

FIG. 17(c) is an illustration showing a flow of the third filtering provided by the image processor according to the third embodiment;

FIG. 21(a) is an illustration showing a flow of the first filtering provided by the image processor according to the fourth embodiment;

FIG. 21(b) is an illustration showing a flow of the second filtering provided by the image processor according to the fourth embodiment;

FIG. 21(c) is an illustration showing a flow of the third filtering provided by the image processor according to the fourth embodiment;

FIGS. 22(a), 22(b), 22(c), 22(d), and 22(e) are descriptive illustrations showing the first filtering provided by the image processor according to the fourth embodiment;

FIGS. 23(a), 23(b), 23(c), 23(d), 23(e), and 23(f) are descriptive illustrations showing the second filtering provided by the image processor according to the fourth embodiment;

FIGS. 24(a), 24(b), 24(c), 24(d), 24(e), and 24(f) are descriptive illustrations showing the third filtering provided by the image processor according to the fourth embodiment;

DETAILED DESCRIPTION OF THE PREFERRED EMBODIMENTS

Embodiments of the present invention are discussed in accordance with the accompanying drawings.

First Embodiment

Figure 1:
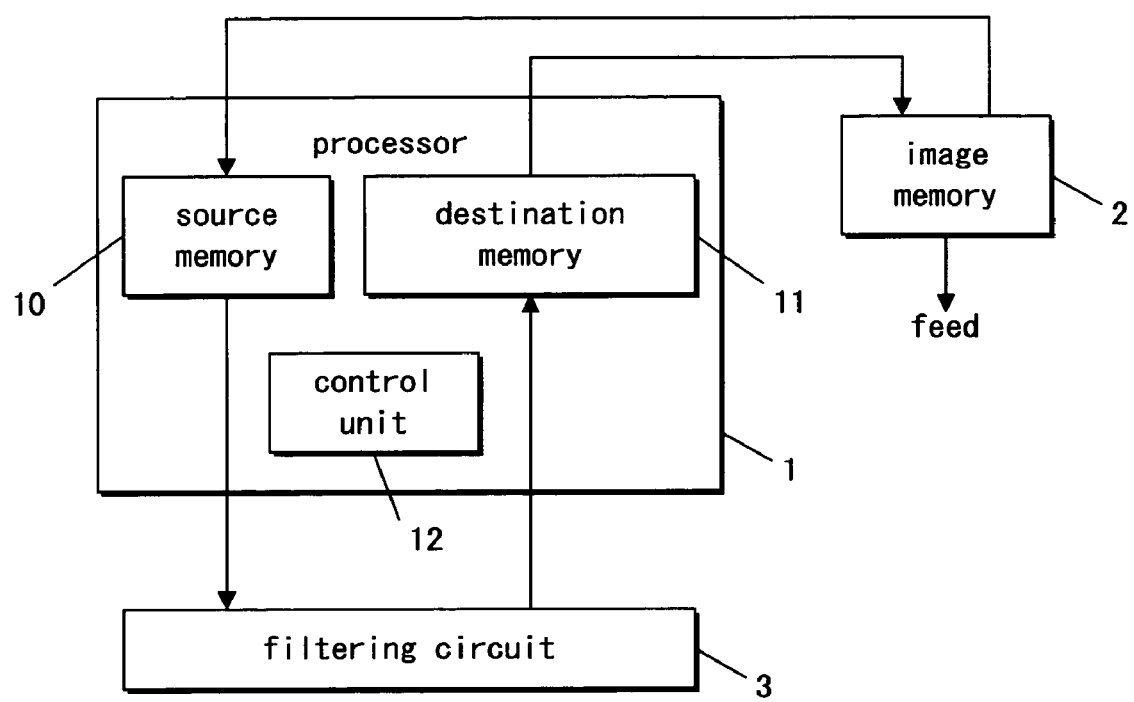
FIG. 1 is a block diagram illustrating an image processor according to a first embodiment of the present invention.

FIG. 1 is a block diagram illustrating an image processor according to a first embodiment.

As illustrated in FIG. 1, the image processor includes a processor 1, an image memory 2, and a filtering circuit 3.

The processor 1 includes a source memory 10, a destination memory 11, and a control unit 12.

Next, the entire behavior of the image processor is briefly discussed.

The processor 1 reads out encoded image data from the image memory 2 and writes the same encoded image data into the source memory 10.

The processor 1 decodes the encoded image data in the source memory 10.

The processor 1 at first places the decoded image data into the destination memory 11, and then transfers the same image data to the image memory 2 from the destination memory 11.

The decoded image data transferred to the image memory 2 is filtered.

In order to filter the decoded image data, 3-lines-by-176-pixels image data are divided into partitions in accordance with the storage capacity of the source memory 10. The divided image data are transmitted to the source memory 10.

The control unit 12 reads out the divided image data from the source memory 10, and then transmits the same image data to the filtering circuit 3.

The filtering circuit 3 filters the divided image data to remove noises.

The control unit 12 writes the divided image data free of the noises to the destination memory 11, and further to the image memory 2.

The above steps are repeated to remove the noises from QCIF-sized image data.

An image output circuit (not shown) feeds the image data free of the noises into a display device (not shown) from the image memory 2. As a result, the image data free of the noises are displayed on the display device (not shown). The display device is, e.g., an LCD (liquid crystal display).

Next, the filtering is briefly discussed.

Figure 2:
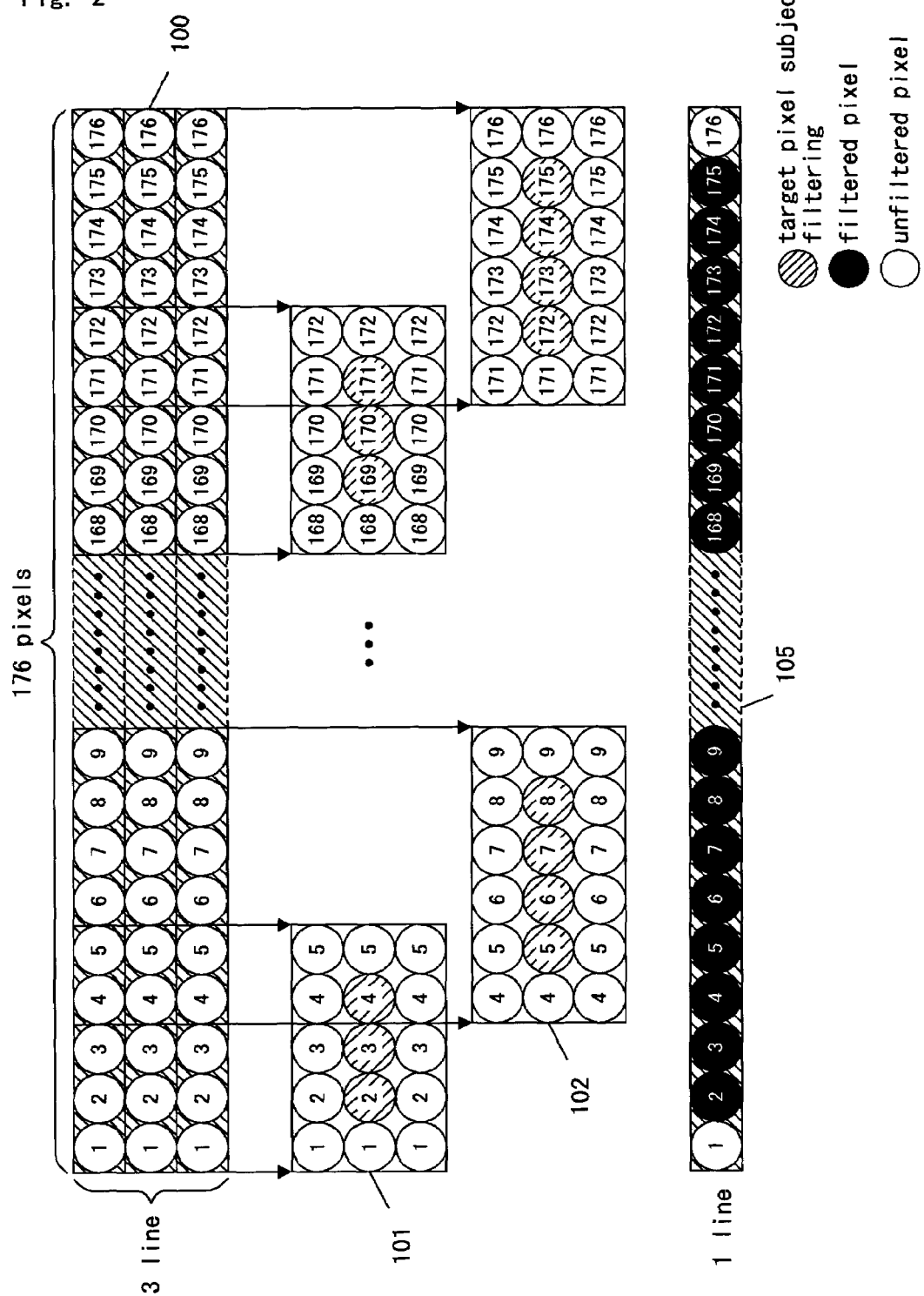
FIG. 2 is a schematic illustration showing how the image processor according to the first embodiment filters image data.

FIG. 2 is a schematic diagram illustrating how the image processor according to the present embodiment filters the image data.

Assume that the image memory 2 of FIG. 1 stores the decoded, QCIF-sized image data.

For convenience of description, FIG. 2 illustrates 3-lines-by-176-pixels image data 100 among the QCIF-sized image data stored in the image memory 2.

In FIG. 2, each piece of image data is illustrated in circle. A circle filled with slant lines denotes image data to be filtered (hereinafter called "target image data subject to filtering"). A blacked out circle denotes filtered target image data subject to filtering (hereinafter simply called "filtered image data").

In FIG. 2, the source memory 10 of FIG. 1 has a storage capacity sufficient to store three-pixels-by-six-pixels image data at maximum.

Each group of three-pixels-by-three-pixels image data is filtered. A pixel located at the center of three pixels-by-three pixels has target image data subject to filtering.

As illustrated in FIG. 2, three-pixels-by-five-pixels image data 101 divided from the 3-lines-by-176-pixels image data 100 is at first transferred to the source memory 10 from the image memory 2.

The image data 101 is sent, for each piece of image data, from the source memory 10 to the filtering circuit 3.

The filtering circuit 3 filters a piece of target image data subject to filtering using the given three-pixels-by-three-pixels image data.

In this way, all three pieces of target image data subject to filtering in the image data 101 are filtered.

Three-pixels-by-six-pixels image data 102 divided from the 3-lines-by-176-pixels image data 100 is transferred to the source memory 10 from the image memory 2.

The image data 102 is sent, for each piece of image data, from the source memory 10 to the filtering circuit 3.

The filtering circuit 3 filters a piece of target image data subject to filtering using the given three-pixels-by-three-pixels image data.

In this way, all four pieces of target image data subject to filtering in the image data 102 are filtered.

The above steps are repeated to filter all target image data subject to filtering in the 3-lines-by-176-pixels image data 100.

As a result, a line of filtered image data 105 is obtained.

In the image data 100, image data in a second line at the both ends thereof are not filtered.

Details of the filtering are now discussed with reference to FIGS. 1, 3, 4, 5, 6, and 7, in which the source memory 10 is designed to store 3-lines-by-64-pixels image data at maximum.

Each gang of three-pixels-by-three-pixels image data is filtered. A pixel located at the center of three pixels-by-three pixels has target image data subject to filtering.

Figure 3:
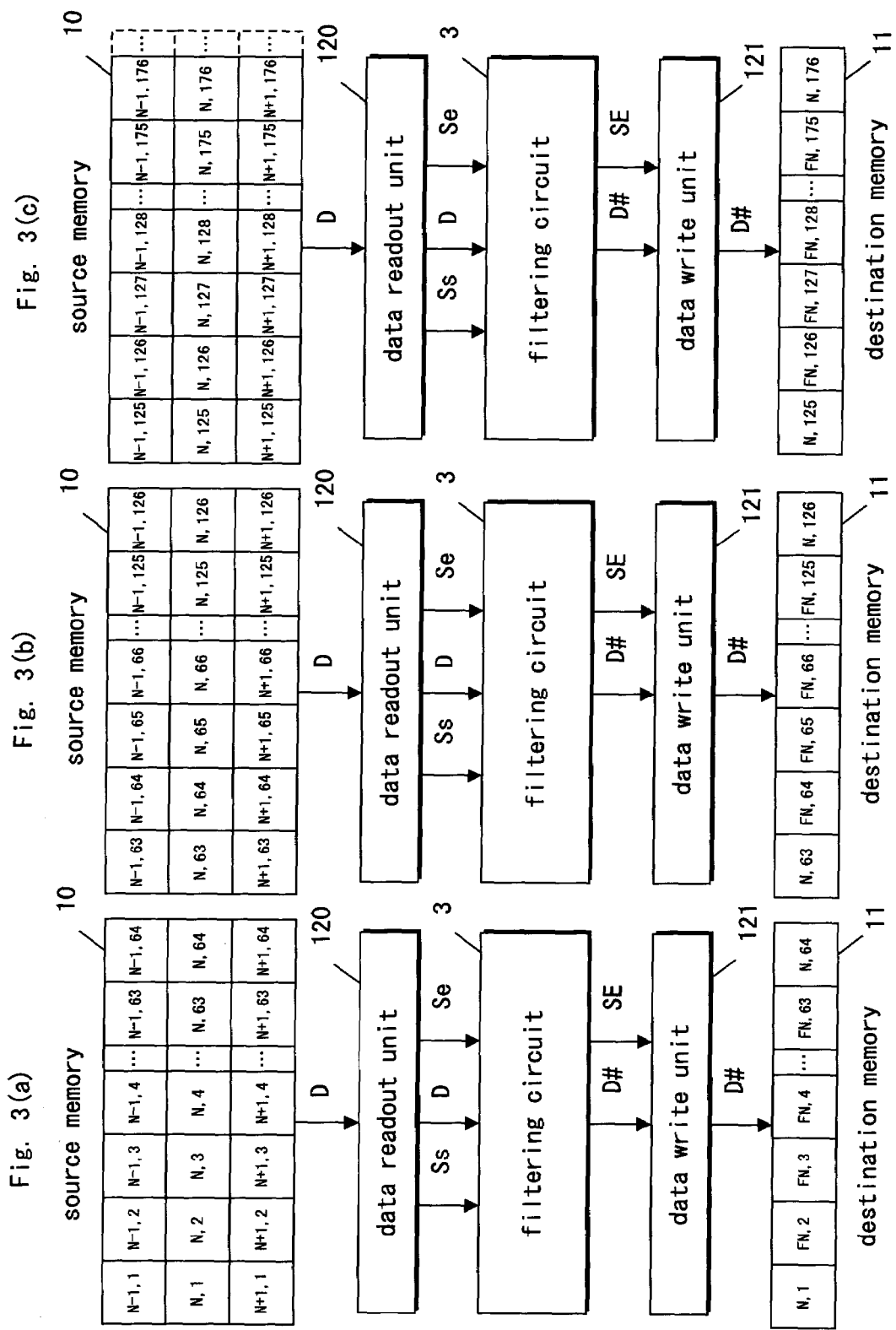
FIG. 3($a$) is an illustration showing a flow of the first filtering provided by the image processor according to the first embodiment.

FIGS. 3(a), 3(b), and 3(c) are illustrations showing a flow of filtering steps. FIG. 3(a) is an illustration showing a flow of first filtering. FIG. 3(b) is an illustration showing a flow of second filtering. FIG. 3(c) is an illustration showing a flow of third filtering. FIG. 3 illustrates the same reference characters on the same components as those described in FIG. 1.

Figure 4:
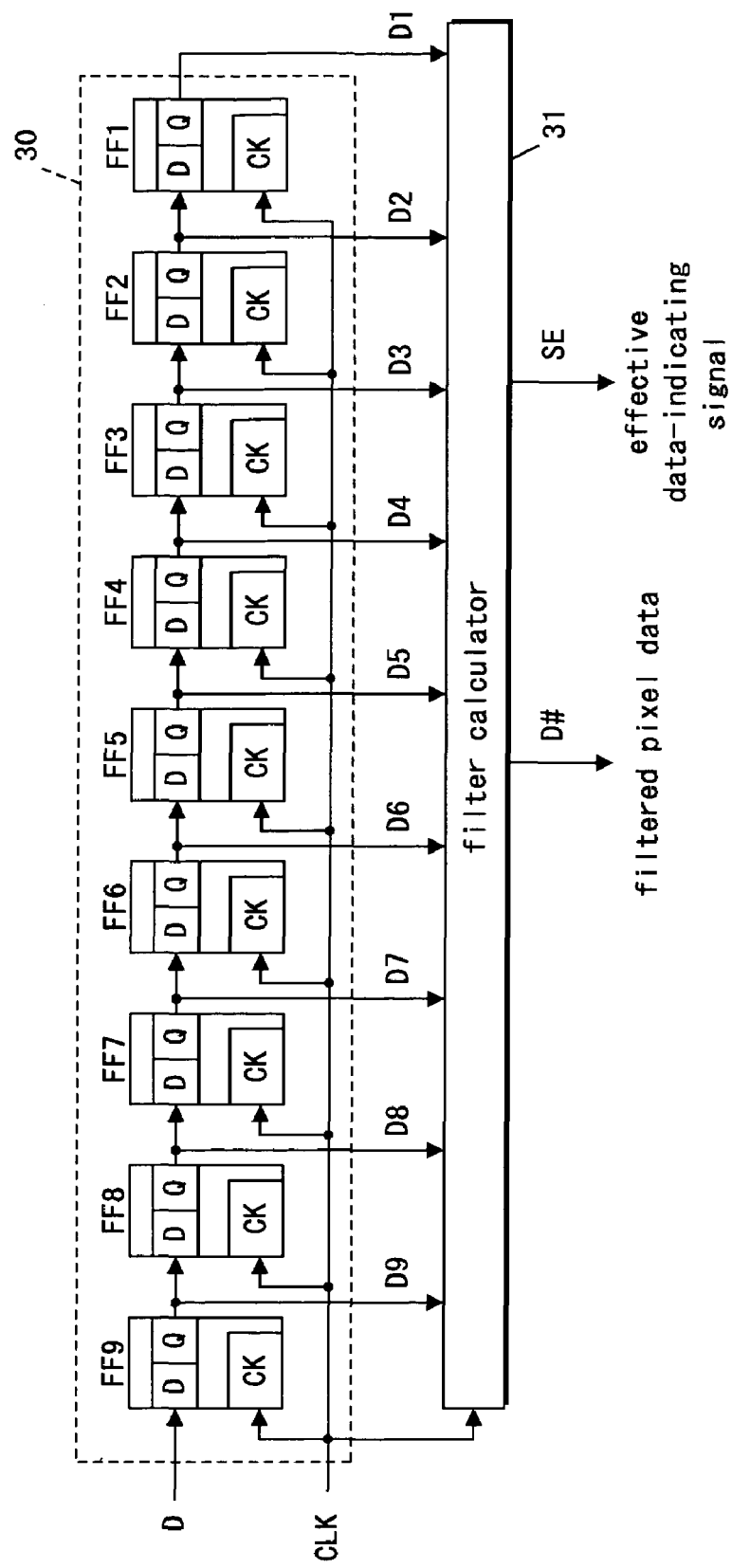
FIG. 4 is a block diagram illustrating a filtering circuit of the image processor according to the first embodiment.

FIG. 4 is a block diagram illustrating the filtering circuit 3 of FIG. 1. As illustrated in FIG. 4, the filtering circuit 3 includes a shift register 30 and a filter calculator 31. The shift register 30 includes nine flip-flops FF1 to FF9.

The filter calculator 31 sometimes feeds image data designated by sign "#". The filter calculator 31 feeds unfiltered image data as well as filtered image data. The unfiltered image data is discussed later.

Figure 5A:
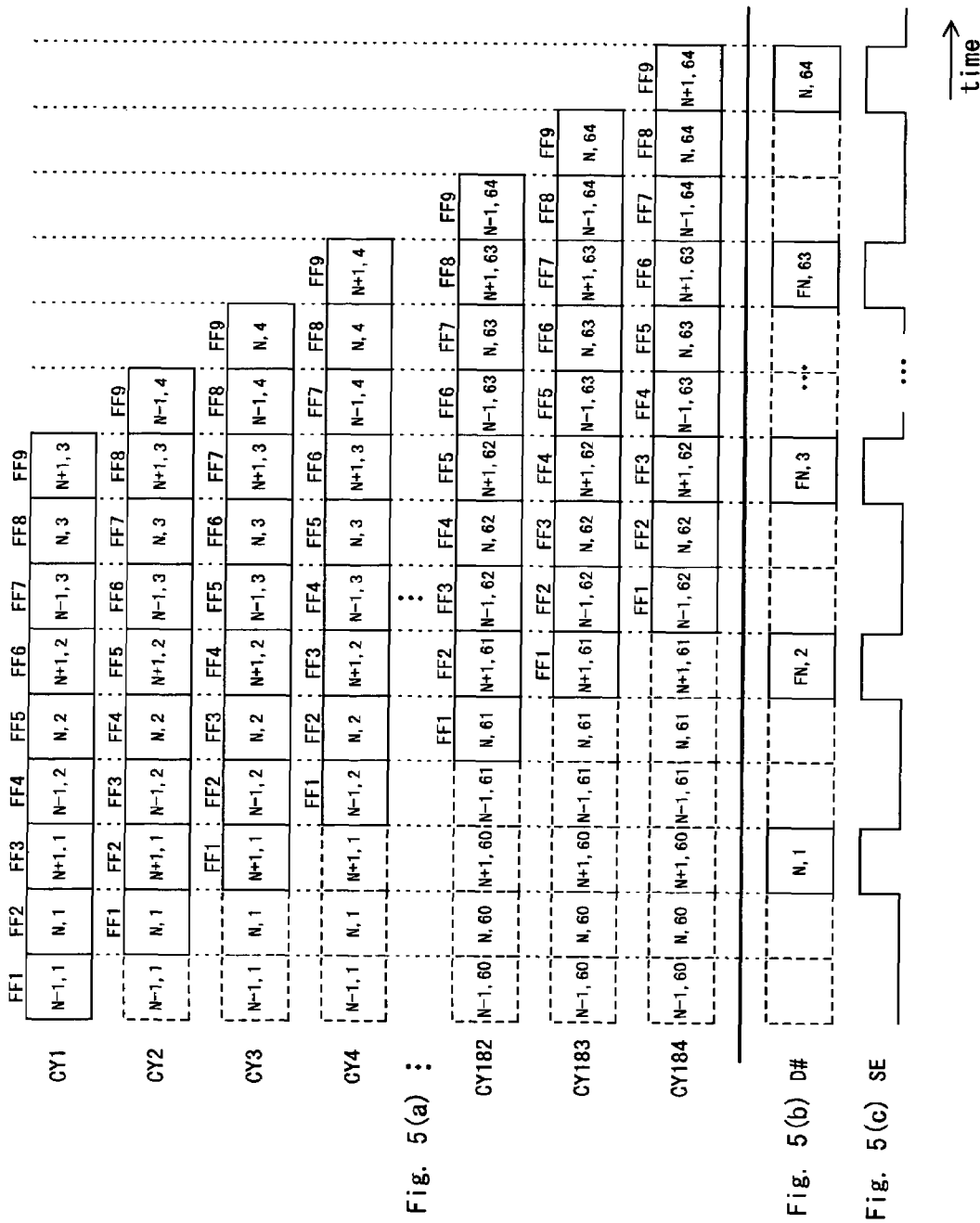
FIGS. 5($a$), 5($b$), and 5($c$) are descriptive illustration showing the first filtering provided by the image processor according to the first embodiment.

FIGS. 5(a), 5(b), and 5(c) are time charts showing the first filtering. FIG. 5(a) is an illustration showing, for each cycle, image data sent to the filter calculator 31 of FIG. 4. FIG. 5(b) is an illustration showing filtered image data fed from the filter calculator 31. FIG. 5(c) is an illustrating showing an effective data-indicating signal fed from the filter calculator 31.

Figure 6A:
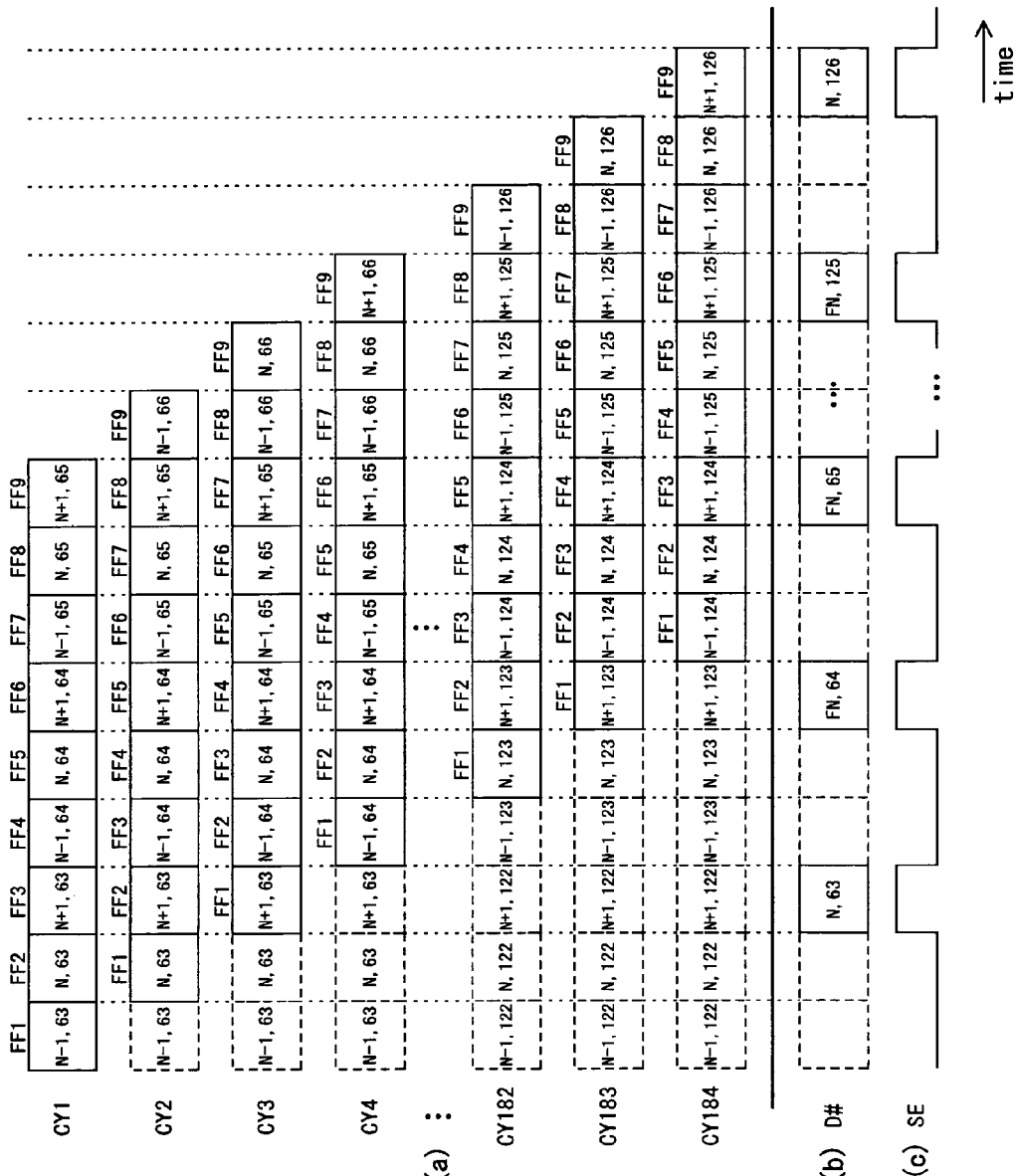
FIGS. 6($a$), 6($b$), and 6($c$) are descriptive illustration showing the second filtering provided by the image processor according to the first embodiment.

FIGS. 6(a), 6(b), and 6(c) are time charts showing the second filtering. FIG. 6(a) is an illustration showing, for each cycle, image data sent to the filter calculator 31. FIG. 6(b) is an illustration showing filtered image data fed from the filter calculator 31. FIG. 6(c) is an illustrating showing an effective data-indicating signal fed from the filter calculator 31.

FIGS. 7(a), 7(b), and 7(c) are time charts showing the third filtering. FIG. 7(a) is an illustration showing, for each cycle, image data sent to the filter calculator 31. FIG. 7(b) is an illustration showing filtered image data fed from the filter calculator 31. FIG. 7(c) is an illustrating showing an effective data-indicating signal fed from the filter calculator 31.

The following discusses details of the first filtering with reference to FIG. 3(a), FIG. 4, and FIGS. 5(a) to 5(c). The first filtering refers to filtering using image data that covers from the first pixel to the sixty-fourth pixel. These pixels are separated from the 3-lines-by-176-pixels image data among the QCIF-sized image data.

As illustrated in FIG. 3(a), the image memory 2 of FIG. 1 transmits 3-pixels-by-64-pixels image data to the source memory 10, in which the transmitted 3-pixels-by-64-pixels image data are stored.

The stored image data is obtained by dividing the 3-lines-by-176-pixels image data among the QCIF-sized image data in the image memory 2 in accordance with the storage capacity of the source memory 10.

The stored image data consists of 192-pieces of image data: (N−1, 1) to (N−1, 64); (N, 1) to (N, 64); and (N+1, 1) to (N+1, 64).

The above image data includes target image data subject to filtering as illustrated by (N, 2) to (N, 63).

For convenience of description, the image data from (N−1, 1) to (N+1, 64) in the source memory 10 are sometimes designated as image data "D".

The data readout unit 120 reads out 3-pixels-by-64-pixels image data from the source memory 10. More specifically, the image data are read out up to (N−1, 64), (N, 64), and (N+1, 64) in the order of (N−1, 1), (N, 1), (N+1, 1), (N−1, 2), (N, 2), (N+1, 2), (N−1, 3), (N, 3), (N+1, 3), (N−1, 4), (N, 4), (N+1, 4), and so on.

The data readout unit 120 feeds the read image data "D" in sequence into the filtering circuit 3.

Pursuant to the present embodiment, the control unit 12 of FIG. 1 functions as the data readout unit 120.

The filtering circuit 3 in receipt of filtering start signal "Ss" from the data readout unit 120 sequentially receives image data "D" from the source memory 10. Filtering start signal "Ss" directs the filtering circuit 3 to start the filtering.

As illustrated in FIG. 4, the shift register 30 sequentially receives image data "D". The shift register 30 provides a shift action in accordance with clock "CLK".

Flip-flops "FF1" to "FF9" feed the retained image data "D1" to "D9" in parallel into the filter calculator 31.

The filter calculator 31 filters the target image data subject to filtering using the nine pieces of image data "D1" to "D9", thereby providing a piece of filtered image data D# as a result of the filtering.

Image data "D" from the source memory 10 sequentially enters the shift register 30. As a result, all of the target image data subject to filtering included in the image data in the source memory 10 are filtered, thereby providing filtered image data "D#".

The data write unit 121 of FIG. 3(a) sequentially writes filtered image data D# to the destination memory 11 of FIG. 1 in accordance with effective data-indicating signal "SE" from the filter calculator 31.

According to the present embodiment, the control unit 12 of FIG. 1 functions as the data write unit 121.

The following discusses further specific steps taken by the filtering circuit 3.

As illustrated in FIG. 5(a), at cycle "CY1", the shift register 30 feeds nine pieces of serially aligned image data (N−1, 1) to (N+1, 3) into the filter calculator 31 in parallel.

The filter calculator 31 filters target image data subject to filtering (N, 2) using the nine pieces of image data (N−1, 1) to (N+1, 3), thereby providing filtered image data (FN, 2) as shown in FIG. 5(b).

As illustrated in FIG. 5(c), the data write unit 121 writes filtered image data (FN, 2) to the destination memory 11 in accordance with effective data-indicating signal "SE" from the filter calculator 31.

The data write unit 121 performs the writing when effective data-indicating signal "SE" is at the level of "H (high)".

As shown in FIG. 5(a), at the next cycle "CY2", the shift register 30 feeds nine pieces of image data (N, 1) to (N−1, 4) in parallel.

At the following cycle "CY3", the shift register 30 feeds nine pieces of image data (N+1, 1) to (N, 4) in parallel.

At cycle "CY4", the shift register 30 feeds nine pieces of image data (N−1, 2) to (N+1, 4) in parallel.

The filter calculator 31 filters target image data subject to filtering (N, 3) using nine pieces of image data (N−1, 2) to (N+1, 4), thereby providing filtered image data (FN, 3) as shown in FIG. 5(b).

As illustrated FIG. 5(c), the data write unit 121 writes filtered image data (FN, 3) to the destination memory 11 in accordance with effective data-indicating signal "SE" from the filter calculator 31.

The above steps are repeated until filtering end signal "Se" enters the filtering circuit 3 from the data readout unit 120.

More specifically, as shown in FIG. 5(a), the filtering circuit 3 repeats the filtering sixty-two times (where each time constists of three cycles), thereby providing sixty-two pieces of filtered image data (FN, 2) to (FN, 63). As a result, the destination memory 11 stores filtered image data (FN, 2) to (FN, 63).

As illustrated in FIG. 5(b), the filter calculator 31 feeds and non-filters two pieces of image data (N, 1) and (N, 64) among the image data in the source memory 10 of FIG. 3(a). Image data (N, 1) and (N, 64) are located in the central line of the image data in the source memory 10 at both ends of the central line.

The data write unit 121 writes the non-filtered image data (N, 1), (N, 64) to the destination memory 11 in accordance with effective data-indication signal "SE" as shown in FIG. 5(c).

As a result, as illustrated FIG. 3(a), the destination memory 11 stores the filtered image data (FN, 2) to (FN, 63) and the non-filtered image data (N, 1), (N, 64).

The image data consisting of (FN, 2) to (FN, 63), (N, 1), and (N, 64) as just discussed are transmitted to the image memory 2.

The following discusses details of the second filtering with reference to FIG. 3(b), FIG. 4, and FIG. 6. The second filtering refers to filtering using image data that covers from the sixty-third pixel to the one hundred and twenty-sixth pixel. These pixels are separated from the 3-lines-by-176-pixels image data among the QCIF-sized image data.

As illustrated in FIG. 3(b), the image memory 2 of FIG. 1 transmits 3-pixels-by-64-pixels image data to the source memory 10, in which the transmitted 3-pixels-by-64-pixels image data is stored.

The stored image data is obtained by dividing the 3-lines-by-176-pixels image data among the QCIF-sized image data in the image memory 2 in accordance with the storage capacity of the source memory 10.

The stored image data consists of 192-pieces of image data: (N−1, 63) to (N−1, 126); (N, 63) to (N, 126); (N+1, 63) to (N+1, 126).

The above image data includes target image data subject to filtering (N, 64) to (N, 125).

For convenience of description, the image data of (N−1, 63) to (N+1, 126) in the source memory 10 are sometimes designated as image data "D".

The data readout unit 120 reads out 3-pixels-by-64-pixels image data from the source memory 10. More specifically, the image data are read out up to (N−1, 126), (N, 126), and (N+1, 126) in the order of (N−1, 63), (N, 63), (N+1, 63), (N−1, 64), (N, 64), (N+1, 64), (N−1, 65), (N, 65), (N+1, 65), (N−1, 66), (N, 66), (N+1, 66), and so on.

The data readout unit 120 feeds the read image data (N−1, 63) etc. in sequence into the filtering circuit 3.

As illustrated in FIG. 6(a), at cycle "CY1", the shift register 30 feeds nine pieces of serially aligned image data (N−1, 63) to (N+1, 65) into the filter calculator 31 in parallel.

The filter calculator 31 filters target image data subject to filtering (N, 64) using the nine pieces of image data (N−1, 63) to (N+1, 65), thereby providing filtered image data (FN, 64) as shown in FIG. 6(b).

As illustrated in FIG. 6(c), the data write unit 121 writes the filtered image data (FN, 64) to the destination memory 11 in accordance with effective data-indicating signal "SE" from the filter calculator 31.

As shown in FIG. 6(a), at the next cycle "CY2", the shift register 30 feeds nine pieces of image data (N, 63) to (N−1, 66) in parallel.

At the following cycle "CY3", the shift register 30 feeds nine pieces of image data (N+1, 63) to (N, 66) in parallel.

At cycle "CY4", the shift register 30 feeds nine pieces of image data (N−1, 64) to (N+1, 66) in parallel.

The filter calculator 31 filters target image data subject to filtering (N, 65) using the nine pieces of image data (N−1, 64) to (N+1, 66), thereby providing filtered image data (FN, 65) as shown in FIG. 6(b).

As illustrated FIG. 6(c), the data write unit 121 writes filtered image data (FN, 65) to the destination memory 11 in accordance with effective data-indicating signal "SE" from the filter calculator 31.

The above steps are repeated until filtering end signal "Se" enters the filtering circuit 3 from the data readout unit 120.

More specifically, as shown in FIG. 6(a), the filtering circuit 3 repeats the filtering sixty-two times (where each time constists of three cycles), thereby providing sixty-two pieces of filtered image data (FN, 64) to (FN, 125). As a result, the destination memory 11 stores filtered image data (FN, 64) to (FN, 125).

As shown in FIG. 6(b), the filter calculator 31 feeds and non-filters two pieces of image data (N, 63) and (N, 126) among the image data in the source memory 10 of FIG. 3(a). Image data (N, 63), (N, 126) are located in the central line of the image data in the source memory 10 at both ends of the central line.

The data write unit 121 writes the non-filtered image data (N, 63), (N, 126) to the destination memory 11 in accordance with effective data-indication signal "SE" as shown in FIG. 6(c).

As a result, as illustrated FIG. 3(b), the destination memory 11 stores the filtered image data (FN, 64) to (FN, 125) and the non-filtered image data (N, 63), (N, 126).

The image data of (FN, 64) to (FN, 125), (N, 63), and (N, 126) as discussed above are transmitted to the image memory 2.

The following discusses details of the third filtering with reference to FIG. 3(c), FIG. 4, and FIG. 7. The third filtering refer to filtering using image data that covers from the one hundred and twenty-fifth pixel to the one hundred and seventy-sixth pixel. These pixels are separated from the 3-lines-by-176-pixels image data among the QCIF-sized image data.

As illustrated in FIG. 3(c), the image memory 2 of FIG. 1 transmits 3-pixels-by-52-pixels image data to the source memory 10, in which the transmitted 3-pixels-by-52-pixels image data are stored.

The stored image data is obtained by dividing the 3-lines-by-176-pixels image data among the QCIF-sized image data in the image memory 2 in accordance with the storage capacity of the source memory 10.

The stored image data consists of 156-pieces of image data: (N−1, 125) to (N−1, 176); (N, 125) to (N, 176); (N+1, 125) to (N+1, 176).

The above image data includes target image data subject to filtering (N, 126) to (N, 175).

For convenience of description, the image data of (N−1, 125) to (N+1, 176) in the source memory 10 are sometimes designated as image data "D".

The data readout unit 120 reads out 3-pixels-by-52-pixels image data from the source memory 10. More specifically, the image data are read out up to (N−1, 176), (N, 176), and (N+1, 176) in the order of (N−1, 125), (N, 125), (N+1, 125), (N−1, 126), (N, 126), (N+1, 126), (N−1, 127), (N, 127), (N+1, 127), (N−1, 128), (N, 128), (N+1, 128), and so on.

The data readout unit 120 feeds the read image data (N−1, 125) etc. in sequence into the filtering circuit 3.

As illustrated in FIG. 7(a), at cycle "CY1", the shift register 30 feeds nine pieces of serially aligned image data (N−1, 125) to (N+1, 127) into the filter calculator 31 in parallel.

The filter calculator 31 filters target image data subject to filtering (N, 126) using nine pieces of image data (N−1, 125) to (N+1, 127), thereby providing filtered image data (FN, 126) as shown in FIG. 7(b).

As illustrated in FIG. 7(c), the data write unit 121 writes the filtered image data (FN, 126) to the destination memory 11 in accordance with effective data-indicating signal "SE" from the filter calculator 31.

As shown in FIG. 7(a), at the next cycle "CY2", the shift register 30 feeds nine pieces of image data (N, 125) to (N−1, 128) in parallel.

At the following cycle "CY3", the shift register 30 feeds nine pieces of image data (N+1, 125) to (N, 128) in parallel.

At cycle "CY4", the shift register 30 feeds nine pieces of image data (N−1, 126) to (N+1, 128) in parallel.

The filter calculator 31 filters target image data subject to filtering (N, 127) using the nine pieces of image data (N−1, 126) to (N+1, 128), thereby providing filtered image data (FN, 127) as shown in FIG. 7(b).

As illustrated FIG. 7(c), the data write unit 121 writes filtered image data (FN, 127) to the destination memory 11 in accordance with effective data-indicating signal "SE" from the filter calculator 31.

The above steps are repeated until filtering end signal "Se" enters the filtering circuit 3 from the data readout unit 120.

More specifically, as shown in FIG. 7(a), the filtering circuit 3 repeats the filtering fifty times (where each time constsits of three cycles), thereby providing fifty pieces of filtered image data (FN, 126) to (FN, 175). As a result, the destination memory 11 stores the filtered image data of (FN, 126) to (FN, 175).

As illustrated in FIG. 7(b), the filter calculator 31 feeds and non-filters two pieces of image data (N, 125) and (N, 176) among the image data in the source memory 10. Image data (N, 125) and (N, 176) are located in the central line of the image data in the source memory 10 at both ends of the central line.

The data write unit 121 writes the non-filtered image data (N, 125), (N, 176) to the destination memory 11 in accordance with effective data-indication signal "SE" as shown in FIG. 7(c).

Consequently, as illustrated FIG. 3(c), the destination memory 11 stores the filtered image data of (FN, 126) to (FN, 175) and the non-filtered image data of (N, 125), (N, 176).

The image data of (FN, 126) to (FN, 175), (N, 125), and (N, 176) are transmitted to the image memory 2.

As a result, the image memory 2 stores: filtered image data (FN, 2) to (FN, 63) and non-filtered image data (N, 1), (N, 64); filtered image data (FN, 64) to (FN, 125) and non-filtered image data (N, 63), (N, 126); and filtered image data (FN, 126) to (FN, 175) and non-filtered image data (N, 125), and (N, 176).

The processor 1 removes unnecessary image data (N, 64), (N, 63), (N, 126), and (N, 125), thereby forming line data that consists of image data from (N, 1), (FN, 2) to (FN, 175), and (N, 176).

In this way, an image output circuit (not shown) feeds a subsequently created series of line data from the image memory 2 to a display device (not shown), thereby displaying the line data on the display device (not shown).

As described above, the image processor according to the present embodiment divides three-lines image data into partitions in accordance with the storage capacity of the source memory 10 to place the partitions into the source memory 10 in order to perform filtering calculation.

Figure 25:
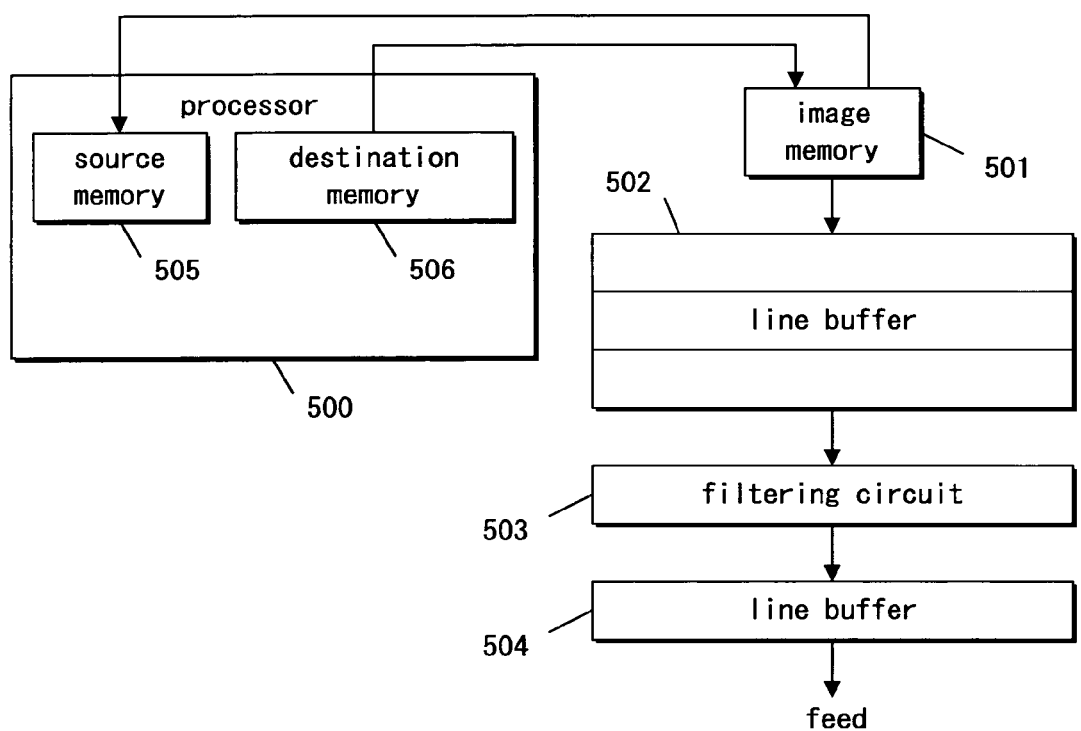
FIG. 25 is a block diagram illustrating a prior art image processor.
Figure 26:
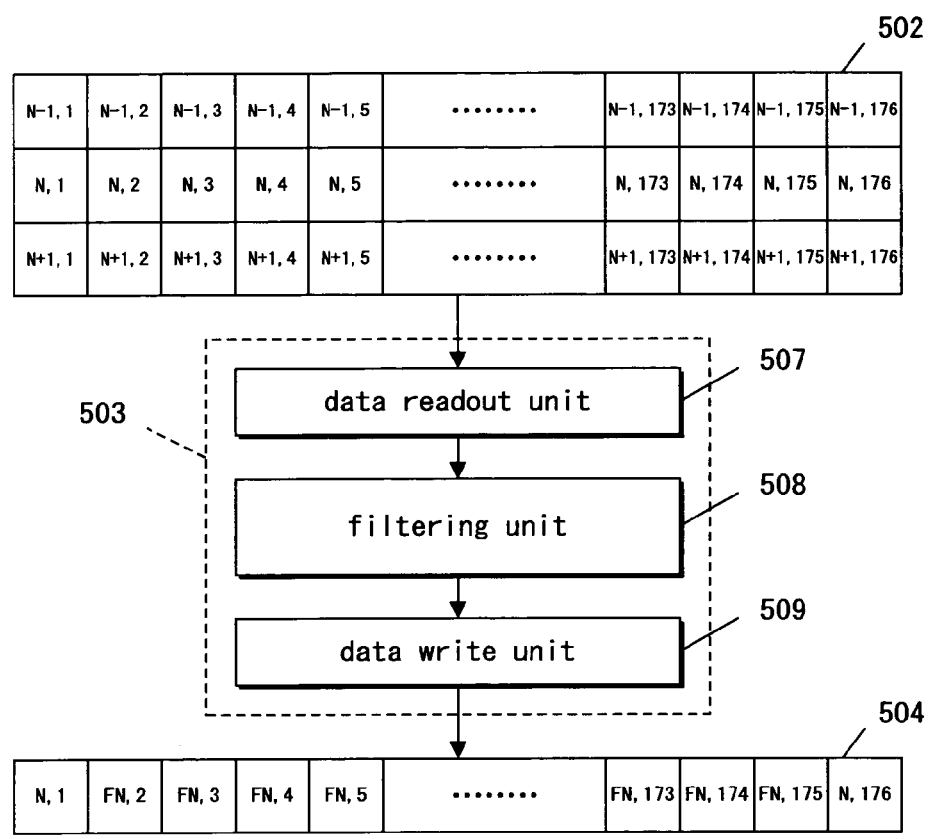
FIG. 26 is a block diagram illustrating a filtering circuit of the prior art image processor.

This feature eliminates a buffer for three lines (see a line buffer 502 of FIG. 25), to which image data are transferred from the image memory 2 to filter the image data, and a buffer for a single line (see a line buffer 504 of FIG. 25) to store filtered image data. This means that a reduced area of an image processor is achievable.

Figure 27:
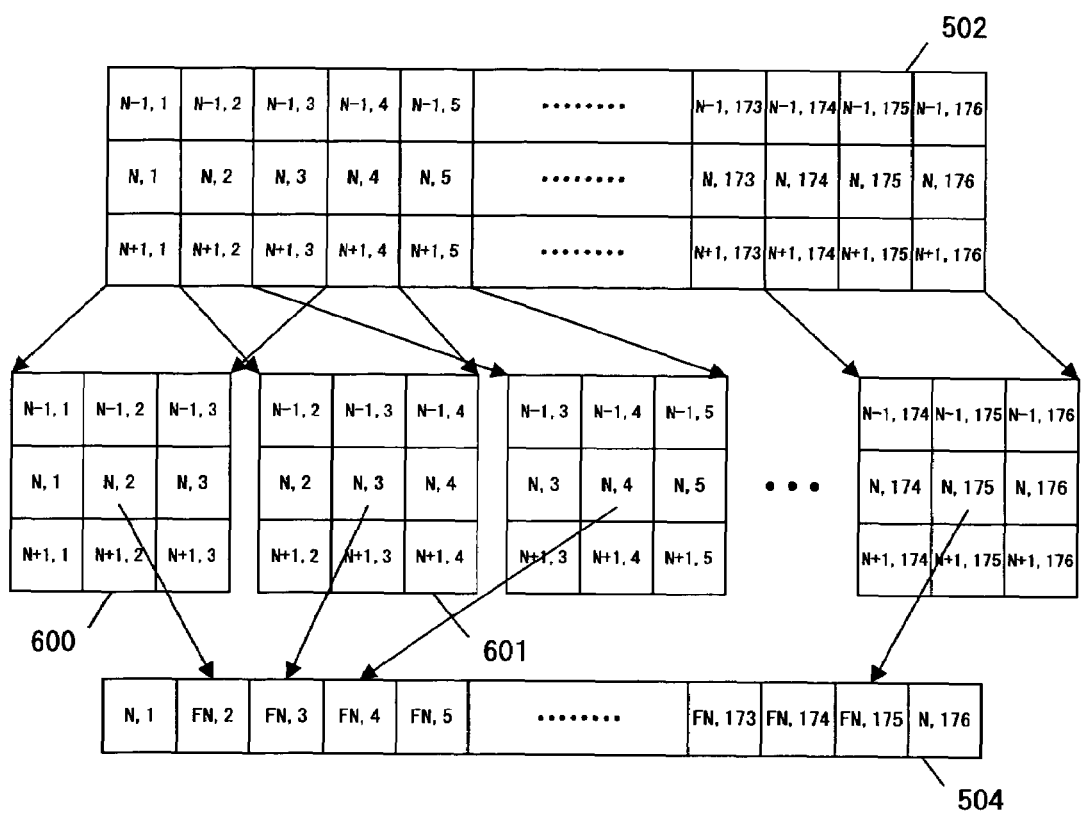
FIG. 27 is a descriptive illustration showing how the prior art image processor filters "N"-line of target pixels subject to filtering; and, FIG. 28 is a descriptive illustration showing how the prior art image processor filters "N+1"-line of target pixels subject to filtering.
Figure 28:
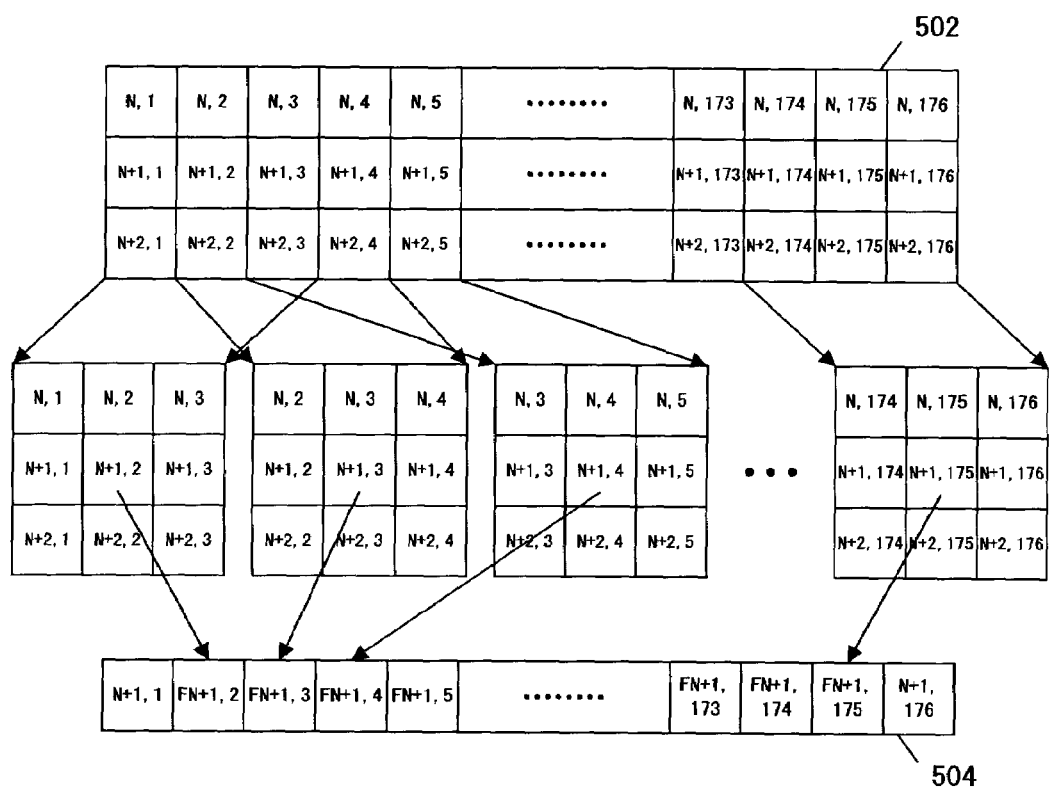

A prior art image processor reads out image data for each gang of three pixels-by-three pixels to filter the image data (see FIGS. 27 and 28). Different from the prior art image processor, the image processor according to the present embodiment is operable to sequentially read out several pieces of image data from the source memory 10. This feature makes it feasible to filter several pieces of target image data subject to filtering without the need to read out the same image data several times. As a result, the target image data subject to filtering can be filtered in a shorter time.

The image processor according to the present embodiment is operable to filter the target image data subject to filtering without providing a fixed number of pixels in a line. This means that the target image data subject to filtering can be filtered independently of an image size.

The present embodiment illustrates the QCIF-sized image as a target to be filtered. However, the present embodiment is not limited thereto.

Assume that "p"-lines-by-"q"-pixels image data are to be filtered, and further that each gang of "P"-pixels-by-"Q"-pixels is filtered. The "p"-lines-by-"q"-pixels image data is divided into several partitions in accordance with the storage capacity of the source memory 10. "P"-pixels-by-"Y"-pixels image data is transmitted to the source memory 10. As a result, filtering calculation is achievable.

Second Embodiment

An image processor according to a second embodiment includes a filtering circuit 4 substituted for the filtering circuit 3 of FIG. 1. The filtering circuit 4 is discussed below. The image processor according to the present embodiment is similar in construction to the image processor of FIG. 1 except for the filtering circuit just discussed above.

FIGS. 8(a), 8(b), and 8(c) are illustrations showing a flow of filtering steps. FIG. 8(a) is an illustration showing a flow of the first filtering. FIG. 8(b) is an illustration showing a flow of the second filtering. FIG. 8(c) is an illustration showing a flow of the third filtering. FIG. 8 illustrates the same reference characters on components similar to those shown in FIG. 1.

Figure 9:
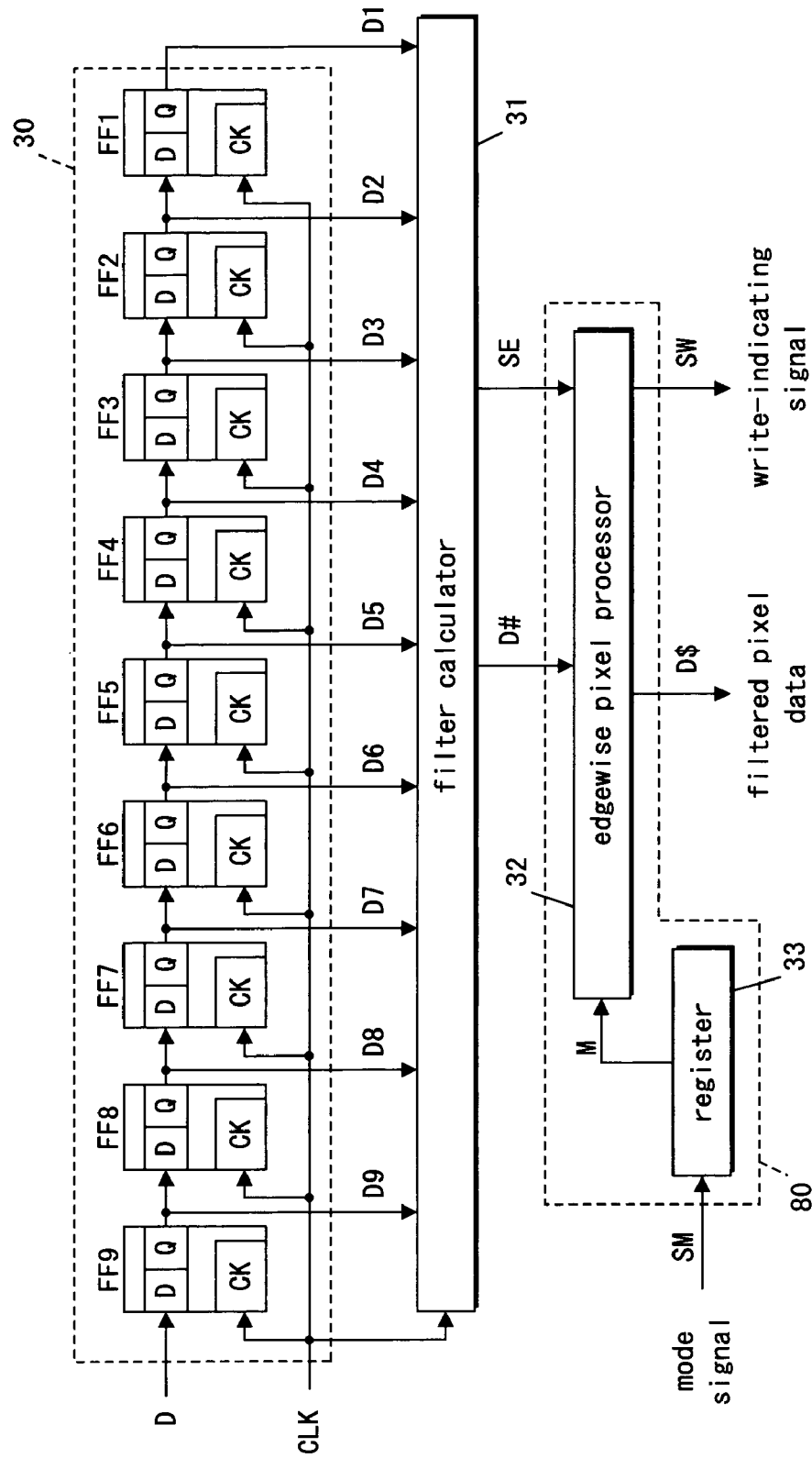
FIG. 9 is a block diagram illustrating a filtering circuit of the image processor according to the second embodiment.

FIG. 9 is a block diagram illustrating the filtering circuit 4. As shown in FIG. 9, the filtering circuit 4 includes a data output control unit 80 other than the same components as those of the filtering circuit 3 of FIG. 4.

The data output control unit 80 includes a register 33 and an edgewise pixel processor 32. The edgewise pixel processor 32 processes edgewise pixels.

The edgewise pixel processor 32 sometimes feeds image data designated as "$". The edgewise pixel processor 32 feeds filtered image data as well as non-filtered image data as discussed later.

FIGS. 10(a), 10(b), 10(c), 10(d), and 10(e) are time charts illustrating the first filtering. FIG. 10(a) is an illustration showing, for each cycle, image data provided to a filter calculator 31 of FIG. 9. FIG. 10(b) is an illustration showing image data fed from the filter calculator 31. FIG. 10(c) is an illustration showing an effective data-indicating signal from the filter calculator 31. FIG. 10(d) is an illustration showing image data written by a data write unit 121 to a destination memory 11. FIG. 10(e) is an illustration showing a write-indicating signal from the edgewise pixel processor 32.

FIGS. 11(a), 11(b), 11(c), 11(d), and 11(e) are time charts illustrating the second filtering. FIG. 11(a) is an illustration showing, for each cycle, image data sent to the filter calculator 31. FIG. 11(b) is an illustration showing image data fed from the filter calculator 31. FIG. 11(c) is an illustration showing an effective data-indicating signal from the filter calculator 31. FIG. 11(d) is an illustration showing image data written by the data write unit 121 to the destination memory 11. FIG. 11(e) is an illustration showing a write-indicating signal from the edgewise pixel processor 32.

FIGS. 12(a), 12(b), 12(c), 12(d), and 12(e) are time charts illustrating the third filtering. FIG. 12(a) is an illustration showing, for each cycle, image data sent to the filter calculator 31. FIG. 12(b) is an illustration showing image data fed from the filter calculator 31. FIG. 12(c) is an illustration showing an effective data-indicating signal from the filter calculator 31. FIG. 12(d) is an illustration showing image data written by the data write unit 121 to the destination memory 11. FIG. 12(e) is an illustration showing a write-indicating signal from the edgewise pixel processor 32.

The filtering steps are now described in the order of the first, second, and third filtering, in which the source memory 10 of FIG. 1 is adapted to store 3-lines-by-64-pixels image data at maximum.

Assume that each gang of three-pixels-by-three-pixels image data is filtered, and further that a pixel located at the center of three pixels-by-three pixels has target image data subject to filtering.

The first filtering is discussed with reference to FIG. 1, FIG. 8(a), FIG. 9, and FIGS. 10(a) to 10(e).

Steps taken until the filter calculator 31 of FIG. 9 feeds filtered image data D# and effective data-indicating signal "SE" are the same as the steps (see FIGS. 5(a) to 5(c)) taken until the filter calculator 31 of FIG. 4 according to the previous embodiment feeds filtered image data D# and effective data-indicating signal "SE". Therefore, descriptions related to the above steps are omitted.

However, before starting the first filtering, mode signal "SM" sets mode information "M" into the register 33 of FIG. 9. Mode information "M" prohibits feeding a rightmost piece of image data. Details of this step are discussed later.

As illustrated in FIG. 10(b), the edgewise pixel processor 32 receives image data (N, 1), (FN, 2) to (FN, 63), and (N, 64) from the filter calculator 31 in accordance with effective data-indicating signal "SE".

As seen from FIG. 10(d), the edgewise pixel processor 32 feeds required image data (N, 1), (FN, 2) to (FN, 63) among the entered image data (N, 1), (FN, 2) to (FN, 63), and (N, 64) into the data write unit 121 in accordance with mode information "M" from the register 33.

As seen from FIG. 10(d), the edgewise pixel processor 32 prohibits feeding unnecessary image data (N, 64) in accordance with mode information "M".

Image data (FN, 2) to (FN, 63) among required image data (N, 1), (FN, 2) to (FN, 63) are filtered image data.

As shown in FIG. 10(e), the edgewise pixel processor 32 feeds write-indicating signal "SW", as well as the required image data (N, 1), (FN, 2) to (FN, 63), into the data write unit 121.

The data write unit 121 writes required image data (N, 1), (FN, 2) to (FN, 63) in sequence to the destination memory 11 in accordance with write-indicating signal "SW" from the edgewise pixel processor 32.

The data write unit 121 writes the above image data when the write-indicating signal "SW" is at the level of "H (high)".

Referring to FIG. 8(a), as a result of the above edgewise pixel processing, only the required image data (N, 1), (FN, 2) to (FN, 63), not the unnecessary image data (N, 64), are written to the destination memory 11.

Image data (N, 1), (FN, 2) to (FN, 63) written to the destination memory 11 are transmitted to the image memory 2.

The second filtering is now discussed with reference to FIG. 1, FIG. 8(b), FIG. 9, and FIGS. 11(a) to 11(e).

Steps taken until the filter calculator 31 of FIG. 9 feeds filtered image data D# and effective data-indicating signal "SE" are the same as the steps (see FIGS. 6(a) to 6(c)) taken until the filter calculator 31 of FIG. 4 according to the previous embodiment feeds filtered image data D# and effective data-indicating signal "SE". Therefore, descriptions related to the above steps are omitted.

However, before starting the second filtering, mode signal "SM" sets mode information "M" into the register 33 of FIG. 9. Mode information "M" prohibits feeding rightmost and leftmost pieces of image data. Details of this step are discussed later.

As illustrated in FIG. 11(b), the edgewise pixel processor 32 receives image data (N, 63), (FN, 64) to (FN, 125), and (N, 126) from the filter calculator 31 in accordance with effective data-indicating signal "SE".

As seen from FIG. 11(d), the edgewise pixel processor 32 feeds required image data (FN, 64) to (FN, 125) among the entered image data (N, 63), (FN, 64) to (FN, 125), and (N, 126) into the data write unit 121 in accordance with mode information "M" from the register 33. The second filtering differs in mode information "M" from the first filtering.

As seen from FIG. 11(d), the edgewise pixel processor 32 prohibits feeding unnecessary image data (N, 63) and (N, 126) in accordance with mode information "M".

The required image data (FN, 64) to (FN, 125) are filtered image data.

As shown in FIG. 11(e), the edgewise pixel processor 32 feeds write-indicating signal "SW", as well as the required image data (FN, 64) to (FN, 125), into the data write unit 121.

The data write unit 121 writes the required image data (FN, 64) to (FN, 125) in sequence to the destination memory 11 in accordance with write-indicating signal "SW" from the edgewise pixel processor 32.

Referring to FIG. 8(b), as a result of the above edgewise pixel processing, the only the required image data (FN, 64) to (FN, 125), not the unnecessary image data (N, 63) and (N, 126), are written to the destination memory 11.

The image data (FN, 64) to (FN, 125) written to the destination memory 11 are transmitted to the image memory 2.

The third filtering is now discussed with reference to FIG. 1, FIG. 8(c), FIG. 9, and FIGS. 12(a) to 12(e).

Steps taken until the filter calculator 31 of FIG. 9 feeds filtered image data D# and effective data-indicating signal "SE" are the same as the steps (see FIGS. 7(*a*) to 7(*c*)) taken until the filter calculator 31 of FIG. 4 according to the previous embodiment feeds filtered image data D# and effective data-indicating signal "SE". Therefore, descriptions related to the above steps are omitted.

However, mode signal "SM" sets mode information "M" into the register 33 of FIG. 9 before the third filtering starts. Mode information "M" prohibits feeding a leftmost piece of image data. Details of this step are discussed later.

As illustrated in FIG. 12(*b*), the edgewise pixel processor 32 receives image data (N, 125), (FN, 126) to (FN, 175), and (N, 176) from the filter calculator 31 in accordance with effective data-indicating signal "SE".

As seen from FIG. 12(*d*), the edgewise pixel processor 32 feeds required image data (FN, 126) to (FN, 175), and (N, 176) among the entered image data (N, 125), (FN, 126) to (FN, 175), and (N, 176) in accordance with mode information "M" from the register 33. The third filtering differs in mode information "M" from the second filtering.

As seen from FIG. 12(*d*), the edgewise pixel processor 32 does not feed unnecessary image data (N, 125) in accordance with mode information "M".

The image data (FN, 126) to (FN, 175) among the required image data (FN, 126) to (FN, 175), and (N, 176) are filtered image data.

As shown in FIG. 12(*e*), the edgewise pixel processor 32 feeds write-indicating signal "SW", as well as the required image data (FN, 126) to (FN, 175), and (N, 176), into the data write unit 121.

The data write unit 121 writes the required image data (FN, 126) to (FN, 175), (N, 176) in sequence to the destination memory 11 in accordance with write-indicating signal "SW" from the edgewise pixel processor 32.

Referring to FIG. 8(*c*), as a result of the above edgewise pixel processing, only the required image data (FN, 126) to (FN, 175), (N, 176), not the unnecessary image data (N, 125), are written to the destination memory 11.

The image data (FN, 126) to (FN, 175), and (N, 176) written to the destination memory 11 are transmitted to the image memory 2.

As a result, the image memory 2 of FIG. 1 stores line data that consist of image data (N, 1), (FN, 2) to (FN, 175), and (N, 176).

In this way, an image output circuit (not shown) feeds a successively created series of line data into a display device (not shown) from the image memory 2, thereby displaying the line data on the display device (not shown).

The following discusses mode information "M" as illustrated in FIG. 9.

As shown in FIG. 9, the register 33 retains mode information "M" according to the entered mode signal "SM".

Mode information "M" is free to change according to mode signal "SM".

In the present embodiment, mode information "M" is set before the first filtering to process edgewise pixels during the first filtering.

Mode information "M" is again set after the first filtering to process the edgewise pixels during the second filtering.

Mode information "M" is again set after the second filtering to process edgewise pixels during the third filtering.

Mode signal "SM" is sent out by, e.g., a command from the processor 1.

Details on mode information "M" of FIG. 9 are now discussed.

FIGS. 13(*a*) to 13(*d*) are descriptive illustrations showing mode information "M" settable in the register 33 of FIG. 9. FIG. 13(*a*) is a descriptive illustration showing mode information "M" of mode 2'*b*00. FIG. 13(*b*) is a descriptive illustration showing mode information "M" of mode 2'*b*01. FIG. 13(*c*) is a descriptive illustration showing mode information "M" of mode 2'*b*10. FIG. 13(*d*) is a descriptive illustration showing mode information "M" of mode 2'*b*11.

FIGS. 13(*a*), 13(*b*), 13(*c*), and 13(*d*) illustrate the filtering using three-pixels-by-six-pixels image data 1 to 18 that are stored in the source memory 10 of FIG. 1.

The filter calculator 31 of FIG. 9 feeds image data 2, 5, 8, 11, 14, and 17 into the edgewise pixel processor 32.

Mode 2'*b*00 is now discussed with reference to FIG. 13(*a*). Mode 2'*b*00 shows that rightmost and leftmost pieces of image data 2, 17 among image data 2, 5, 8, 11, 14, and 17 from the filter calculator 31 are non-filtered image data required for display; and the remaining image data 5, 8, 11, and 14 are filtered image data.

When mode signal "SM" sets mode information "M" of mode 2'*b*00 into the register 33, then the edgewise pixel processor 32 feeds all of the entered image data 2, 5, 8, 11, 14, and 17 as well as write-indicating signal "SW". The write-indicating signal "SW" writes all of the entered image data 2, 5, 8, 11, 14, and 17 to the destination memory 11.

FIG. 13(*a*) to FIG. 13(*c*) name the non-filtered image data required for display as "through-data".

Mode 2'*b*00 is set when 3-lines-by-176-pixels image data is transmitted to the source memory 10 to filter target image data subject to filtering, provided that a QCIF image is to be processed, and further that each gang of three pixels-by-three pixels is to be filtered.

Mode 2'*b*01 is now discussed with reference to FIG. 13(*b*). Mode 2'*b*01 shows that image data 2 among image data 2, 5, 8, 11, 14, and 17 from the filter calculator 31 is non-filtered image data required for display; image data 5, 8, 11, and 14 are filtered image data; and the remaining image data 17 is unnecessary image data.

When mode signal "SM" sets mode information "M" of mode 2'*b*01 into the register 33, then the edgewise pixel processor 32 feeds image data 2, 5, 8, 11, and 14 among the entered image data 2, 5, 8, 11, 14, and 17, but does not feed image data 17.

The edgewise pixel processor 32 feeds write-indicating signal "SW" to the data write unit 121. The write-indicating signal "SW" allows the data write unit 121 to write only image data 2, 5, 8, 11, and 14 to the destination memory 11.

Mode 2'*b*01 is set when, e.g., a rightmost piece of image data (N, 64) is not fed as illustrated in FIG. 10(*d*).

As a result, the register 33 is set into mode 2'*b*01 during the first filtering.

Mode 2'*b*10 is now discussed with reference to FIG. 13(*c*). Mode 2'*b*10 shows that image data 2 among image data 2, 5, 8, 11, 14, and 17 from the filter calculator 31 is unnecessary image data; image data 5, 8, 11, and 14 are filtered image data; and the remaining image data 17 is non-filtered image data required for display.

When mode signal "SM" sets mode information "M" of mode 2'*b*10 into the register 33, then the edgewise pixel processor 32 feeds image data 5, 8, 11, 14, and 17 among image data 2, 5, 8, 11, 14, and 17, but does not feed image data 2.

The edgewise pixel processor 32 feeds write-indicating signal "SW" to the data write unit 121. The write-indicating signal "SW" allows the data write unit 121 to write only image data 5, 8, 11, 14, and 17 to the destination memory 11.

Mode 2′b10 is set when, e.g., a leftmost piece of image data (N, 125) is not fed as illustrated in FIG. 12(d).

As a result, the register 33 is set into mode 2′b10 during the third filtering.

Mode 2′b11 is now discussed with reference to FIG. 13(d). Mode 2′b11 shows that image data 2, 17 among image data 2, 5, 8, 11, 14, and 17 from the filter calculator 31 are unnecessary image data; and image data 5, 8, 11, and 14 are filtered image data, When mode signal "SM" sets mode information "M" of mode 2′b11 into the register 33, then the edgewise pixel processor 32 feeds image data 5, 8, 11, and 14 among image data 2, 5, 8, 11, 14, and 17, but does not feed image data 2 and 17.

The edgewise pixel processor 32 feeds write-indicating signal "SW" to the data write unit 121. The write-indicating signal "SW" allows the data write unit 121 to write only image data 5, 8, 11, and 14 to the destination memory 11.

Mode 2′b11 is set when, e.g., rightmost and leftmost pieces of image data (N, 63), (N, 126) are not fed as illustrated in FIG. 11(d).

As a result, the register 33 is set into mode 2′b11 during the second filtering.

The following discusses mode information "M" with reference to a specific example.

Figure 14A:
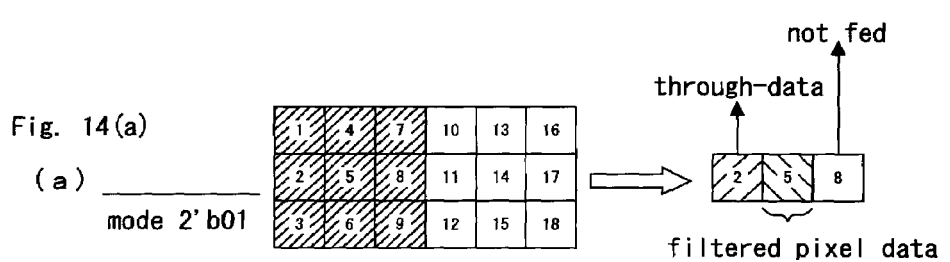
FIG. 14($a$) is a descriptive illustration showing the usage of mode information 2'$b$01 in the image processor according to the second embodiment.
Figure 14B:
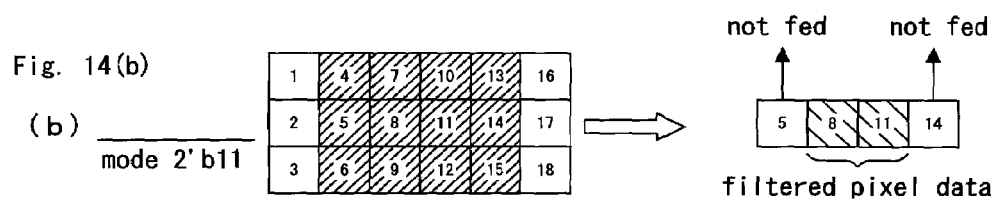
Figure 14C:
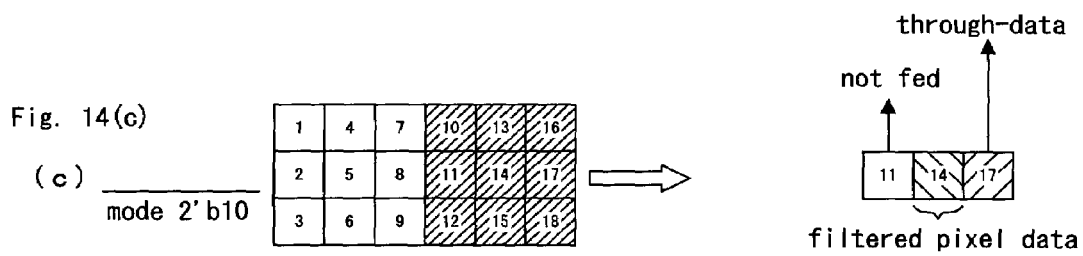

FIGS. 14(a), 14(b), and 14(c) illustrate how mode information "M" is used. FIG. 14(a) illustrates the use of mode 2′b01. FIG. 14(b) illustrates the use of mode 2′b11. FIG. 14(c) illustrates the use of mode 2′b10.

FIGS. 14(a), 14(b), and 14(c) show, as an illustration, how three-pixels-by-six-pixels image data are filtered.

As illustrated in FIGS. 14(a) to 14(c), assume that the image memory 2 of FIG. 1 stores image data 1 to 18.

As shown in FIG. 14(a), assume that image data 1 to 9 are transmitted to the source memory 10 of FIG. 1.

At this time, the register 33 is set into mode 2′b01. As a result, the edgewise pixel processor 32 feeds only image data 2 and 5 among the entered image data 2, 5, and 8 from the filter calculator 31.

As illustrated in FIG. 14(b), assume that image data 4 to 15 are transmitted to the source memory 10.

At this time, the register 33 is set into mode 2′b11. As a result, the edgewise pixel processor 32 feeds only image data 8 and 11 among the entered image data 5, 8, 11, and 14 from the filter calculator 31.

As shown in FIG. 14(c), assume that image data 10 to 18 are transmitted to the source memory 10.

At this time, the register 33 of FIG. 9 is set into mode 2′b10. As a result, the edgewise pixel processor 32 feeds only image data 14 and 17 among the entered image data 11, 14, and 17 from the filter calculator 31.

As described above, the image processor according to the present embodiment is possible to prepare line data in a reduced time because a gang of filtered image data is free of unnecessary image data (N, 64), (N, 63), (N, 126), and (N, 125), as illustrated in FIG. 8. The unnecessary image data (N, 64), (N, 63), (N, 126), and (N, 125) are produced in the course of filtering the target image data subject to filtering.

The image processor according to the present embodiment includes the construction of the image processor according to the previous embodiment, and consequently provides beneficial effects similar to those achieved in the previous embodiment.

Third Embodiment

An image processor according to a third embodiment includes a filtering circuit substituted for the filtering circuit 3 of FIG. 1. The filtering circuit 5 is discussed below. The image processor according to the present embodiment is similar to those of the image processor of FIG. 1 except for the filtering circuit as just discussed above.

Figure 15:
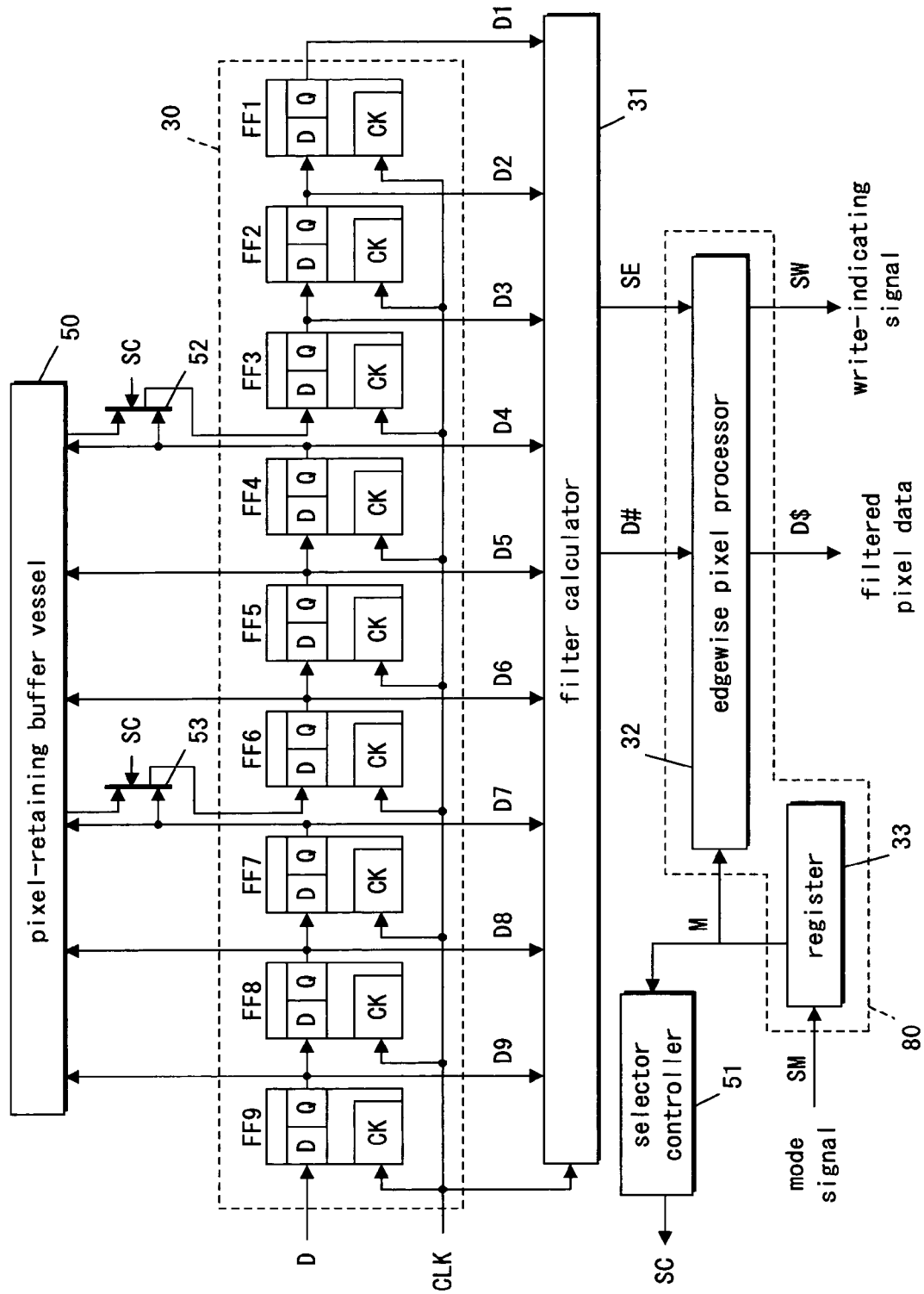
FIG. 15 is a block diagram illustrating a filtering circuit of an image processor according to a third embodiment.

FIG. 15 is a block diagram illustrating the filtering circuit 5. As shown in FIG. 15, the filtering circuit 5 includes a pixel-retaining buffer unit 50, selectors 52, 53, and a selector controller 51, other than components of the filtering circuit 4 of FIG. 9.

Filtering is now discussed in brief.

Figure 16:
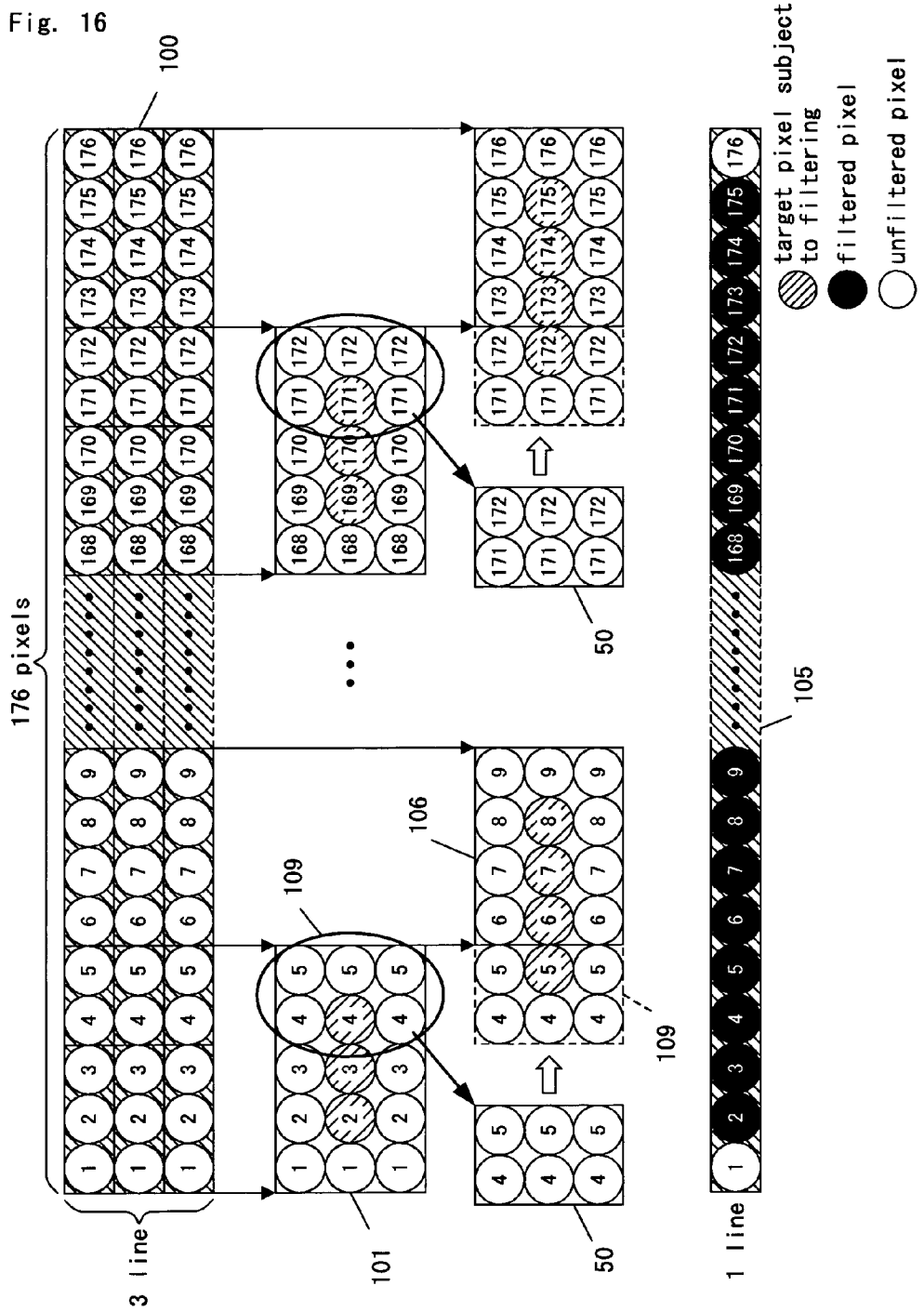
FIG. 16 is a schematic illustration showing how the image processor according to the third embodiment filters image data.

FIG. 16 is a schematic illustration showing how the image processor according to the present embodiment is operable to filter target image data subject to filtering. FIG. 16 is similar in notation to FIG. 2.

As illustrated in FIG. 16, three-pixels-by-five-pixels image data 101 obtained by dividing 3-lines-by-176-pixels image data 100 is transmitted to the source memory 10 from the image memory 2 of FIG. 1.

The source memory 10 feeds the image data 101 in sequence to the filtering circuit 5 for each piece of image data.

The filtering circuit 5 filters a piece of target image data subject to filtering using the given three-pixels-by-three-pixels image data.

In this way, the filtering circuit 5 filters all three pieces of target image data subject to filtering that are stored in the image data 101.

When completing the present filtering, then the filtering circuit 5 places image data 109 into the pixel-retaining buffer unit 50 for use at the time of the next filtering.

Subsequently, three-pixels-by-four-pixels image data 106 obtained by dividing 3-lines-by-176-pixels image data 100 is transmitted to the source memory 10 from the image memory 2.

The filtering circuit 5 filters target image data subject to filtering using the image data 106 in the source memory 10 and the image data 109 in the pixel-retaining buffer 50.

The above steps are repeated to filter all pieces of target image data subject to filtering that are stored in 3-lines-by-176-pixels image data 100. As a result, a line of filtered image data 105 is achieved.

As previously discussed, when filtering the image data 101 is completed, then the filtering circuit 5 according to the present embodiment puts the image data 109 among the image data 101 into the pixel-retaining buffer unit 50 in order to use the image data 109 at the time of the following filtering.

This feature provides a smaller number of times of transferring image data from the image memory 2 to the source memory 10 and a smaller number of times of transferring image data from the source memory 10 to the filtering circuit 5.

The following discusses details of the filtering with reference to FIGS. 1, 15, 17, and 18, in which the source memory 10 of FIG. 1 is adapted to store 3-lines-by-64-pixels image data at maximum.

Assume that each gang of three-pixels-by-three-pixels image data is filtered, and further that a pixel located at the center of three pixels-by-three pixels has target image data subject to filtering.

FIGS. 17(a), 17(b), and 17(c) are illustrations showing a flow of filtering steps. FIG. 17(a) is an illustration showing a flow of first filtering. FIG. 17(b) is an illustration showing a flow of second filtering. FIG. 17(c) is an illustration showing a flow of third filtering. FIG. 17 illustrates the same reference numerals on components similar to those described in FIG. 1.

Figures 18A, 18B, 18C:
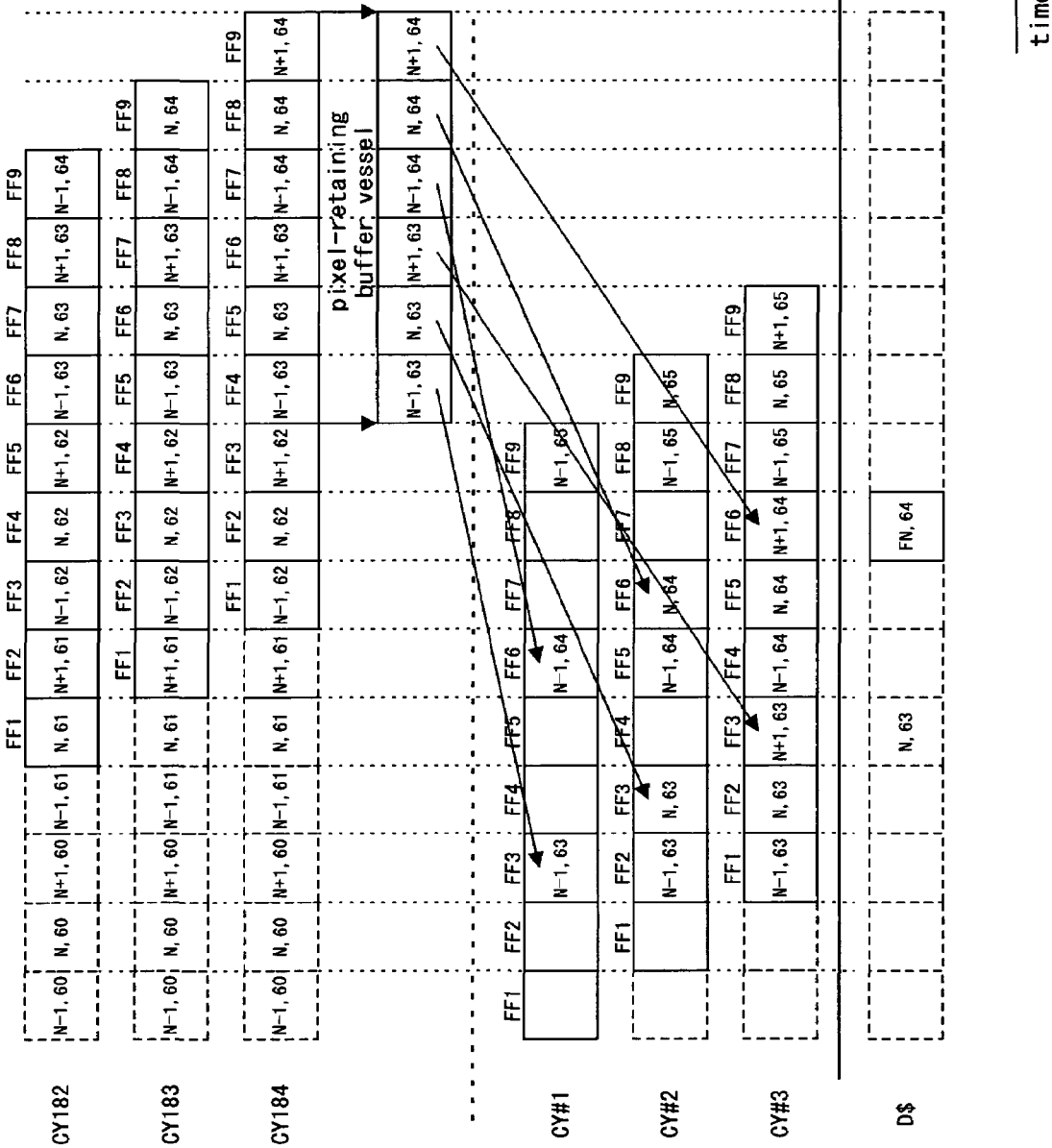
FIGS. 18(a), 18(b), and 18(c) are descriptive illustrations showing characteristics of filtering steps taken by the image processor according to the third embodiment.

FIGS. 18(a), 18(b), and 18(c) are time charts showing characteristics of the filtering according to the present embodiment. FIG. 18(a) is an illustration showing how image data is transferred from a shift register 30 to the pixel-retaining buffer unit 50 at the end of the first filtering. FIG. 18(b) is an illustration showing when the second filtering is started. FIG. 18(c) is an illustration showing image data written to a destination memory 11 from a data write unit 121.

The first filtering is similar to that according to the second embodiment as illustrated in FIGS. 10(a) to 10(e). Therefore, descriptions related thereto are omitted.

However, the first filtering is followed by additional steps as discussed below when the first filtering is completed.

As illustrated in FIG. 18(a), at the last cycle "CY184" of the first filtering, flip-flops FF1 to FF9 of the shift register 30 feeds image data (N−1, 62) to (N+1, 64), respectively.

Image data (N−1, 63), (N, 63) (N+1, 63), (N−1, 64), (N, 64), and (N+1, 64) among the above image data (N−1, 62) to (N+1, 64) are placed into the pixel-retaining buffer unit 50 for use at the time of the second filtering.

More specifically, the pixel-retaining buffer unit 50 stores image data (N−1, 63), (N, 63), (N+1, 63), (N−1, 64), (N, 64), and (N+1, 64) that are supplied at the last cycle "CY184" from flip-flops FF4, FF5, FF6, FF7, FF8, and FF9, respectively.

The second filtering is now described. After the first filtering ends, mode signal "SM" sets up mode information "M" (mode 2'b11 of FIG. 13(d)) that prohibits feeding rightmost and leftmost pieces of image data.

As illustrated in FIG. 17(b), image data (N−1, 65), (N, 65), (N+1, 65) to (N−1, 126), (N, 126), and (N+1, 126) are transmitted to the source memory 10 from the image memory 2.

At this time, image data (N−1, 63), (N, 63), (N+1, 63), (N−1, 64), (N, 64), and (N+1, 64) are not transmitted to the source memory 10. Instead, the second filtering employs image data (N−1, 63), (N, 63), (N+1, 63), (N−1, 64), (N, 64), and (N+1, 64), all of which are retained in pixel-retaining buffer unit 50.

As shown in FIG. 18(b), at the first cycle "CY#1" of the second filtering, the flip-flop FF 9 feeds image data (N−1, 65) from the source memory 10.

At cycle "CY#1", the flip-flops FF3, FF6 feed image data (N−1, 63), (N−1, 64) from the pixel-retaining buffer unit 50, respectively.

At the following cycle "CY#2", flip-flop FF 9 feeds image data (N, 65) from the source memory 10, while flip-flop FF 8 feeds image data (N−1, 65) that is shifted from flip-flop FF 9.

At cycle "CY#2", flip-flops FF3, FF6 feeds image data (N, 63), (N, 64) from the pixel-retaining buffer unit 50, respectively, while flip-flops FF2, FF5 feeds image data (N−1, 63), (N−1, 64) that are shifted from flip-flops FF3, FF6, respectively.

At the following cycle "CY#3", flip-flop FF 9 feeds image data (N+1, 65) from the source memory 10, while flip-flops FF7, FF8 feed image data (N−1, 65), (N, 65) that are shifted from flip-flops FF8, FF9, respectively.

At cycle "CY#3", flip-flops FF3, FF6 feeds image data (N+1, 63), (N+1, 64) from the pixel-retaining buffer unit 50, respectively, while flip-flops FF1, FF2, FF4, and FF5 feed image data (N−1, 63), (N, 63), (N−1, 64), and (N, 64) that are shifted from flip-flops FF2, FF3, FF5, and FF6, respectively.

At this time, as shown in FIG. 18(c), the first filtered image data (FN, 64) is fed. Thereafter, usual shift actions similar to those according to the second embodiment are provided to filter target image data subject to filtering.

Similar to the first filtering, image data for use at the time of the third filtering are held in the pixel-retaining buffer unit 50 at the end of the second filtering.

More specifically, when the second filtering is terminated, then the pixel-retaining buffer unit 50 retains image data (N−1, 125), (N, 125), (N+1, 125), (N−1, 126), (N, 126), and (N+1, 126) from flip-flops FF4, FF5, FF6, FF7, FF8, and FF9, respectively.

The third filtering is now described. After the end of the second filtering, mode signal "SM" sets up mode information "M" (mode 2'b10 of FIG. 13(c)) that prohibits feeding a leftmost piece of image data.

As shown in FIG. 17(c), image data (N−1, 127), (N, 127), (N+1, 127) to (N−1, 176), (N, 176), and (N+1, 176) are transmitted to the source memory 10 from the image memory 2.

At this time, image data (N−1, 125), (N, 125), (N+1, 125), (N−1, 126), (N, 126), and (N+1, 126) are not transmitted to the source memory 10. Instead, the third filtering employs image data (N−1, 125), (N, 125), (N+1, 125), (N−1, 126), (N, 126), and (N+1, 126) that are held in the pixel-retaining buffer unit 50.

In the third filtering, first to third cycles are similar to those in the second filtering. More specifically, the shift register 30 feeds image data from the source memory 10 and the pixel-retaining buffer unit 50 to filter target image data subject to filtering. The filtering at the fourth or greater cycles is similar to that according to the second embodiment.

The following discusses, with reference to FIG. 15, details of image data transfer to the pixel-retaining buffer unit 50 and details of image data transfer from the pixel-retaining buffer unit 50 to the shift register 30.

Mode information "M" currently held in the register 33 is sent to the selector controller 51.

The selector controller 51 produces selection signal "SC" based on mode information "M". The selection signal SC is provided to selectors 52 and 53.

The selector 52 receives image data from the pixel-retaining buffer unit 50 and image data from flip-flop FF 4.

The selector 52 selects either the image data from the pixel-retaining buffer unit 50 or that from flip-flop FF 4 in accordance with selection signal "SC". The selector 52 feeds the selected image data into flip-flop FF 3.

The selector 53 receives image data from the pixel-retaining buffer unit 50 and image data from flip-flop FF 7.

The selector 53 selects either the image data from the pixel-retaining buffer unit 50 or that from flip-flop FF 7 in accordance with selection signal "SC". The selector 53 feeds the selected image data into the flip-flop FF 6.

The above steps are now described with reference to FIGS. 18(a) and 18(b). As illustrated in FIG. 18(a), at cycle "CY184" of the first filtering, image data (N−1, 63), (N, 63), (N+1, 63), (N−1, 64), (N, 64), and (N+1, 64) from flip-flops FF4, FF5, FF6, FF7, FF8, and FF9 are held in the pixel-retaining buffer unit 50.

As shown in FIG. 18(b), at cycle "CY#1" of the second filtering, flip-flops FF3, FF6 feed image data (N−1, 63), (N−1, 64), respectively.

The selector 52 selects image data (N−1, 63) from the pixel-retaining buffer unit 50 before cycle "CY#1" in accordance with selection signal "SC", and then feeds the selected image data (N−1, 63) into flip-flop FF 3.

The selector 53 selects image data (N−1, 64) from the pixel-retaining buffer unit 50 before cycle "CY#1" in accordance with selection signal "SC", and then feeds the selected image data (N−1, 64) into flip-flop FF 6.

As shown in FIG. 18(*b*), at cycle "CY#2", flip-flops FF3, FF6 feed image data (N, 63), (N, 64), respectively.

The selector 52 selects image data (N, 63) from the pixel-retaining buffer unit 50 before cycle "CY#2" in accordance with selection signal "SC", and then feeds the selected image data (N, 63) into flip-flop FF 3.

The selector 53 selects image data (N, 64) from the pixel-retaining buffer unit 50 before cycle "CY#2" in accordance with selection signal "SC", and then feeds the selected image data (N, 64) into flip-flop FF 6.

As illustrated in FIG. 18(*b*), at cycle "CY#3", flip-flops FF3, FF6 feeds image data (N+1, 63), (N+1, 64), respectively.

The selector 52 selects image data (N+1, 63) from the pixel-retaining buffer unit 50 before cycle "CY#3" in accordance with selection signal "SC", and then feeds the selected image data (N+1, 63) into flip-flop FF 3.

The selector 53 selects image data (N+1, 64) from the pixel-retaining buffer unit 50 before cycle "CY#3" in accordance with selection signal "SC", and then feeds the selected image data (N+1, 64) into flip-flop FF 6.

Thereafter, the selectors 52, 53 select, in accordance with selection signal "SC", respective pieces of image data that flip-flops FF4, FF7 feed.

As previously discussed, the image processor according the present embodiment is operable to retain image data required for use at the time of the next filtering when the present filtering is terminated. As a result, the retained image data are usable at the time of the next filtering. This feature provides a reduced number of times of transferring the data.

The image processor according to the present embodiment includes the construction of the image processor according to the second embodiment. Therefore, the image processor according to the present embodiment provides beneficial effects similar to those obtained in the second embodiment.

Fourth Embodiment

An image processor according to a fourth embodiment includes a filtering circuit 6 substituted for the filtering circuit 3 of FIG. 1. The filtering circuit 6 is discussed below. The image processor according to the present embodiment is similar in construction to the image processor of FIG. 1 except for filtering circuit as just discussed above.

Figure 19:
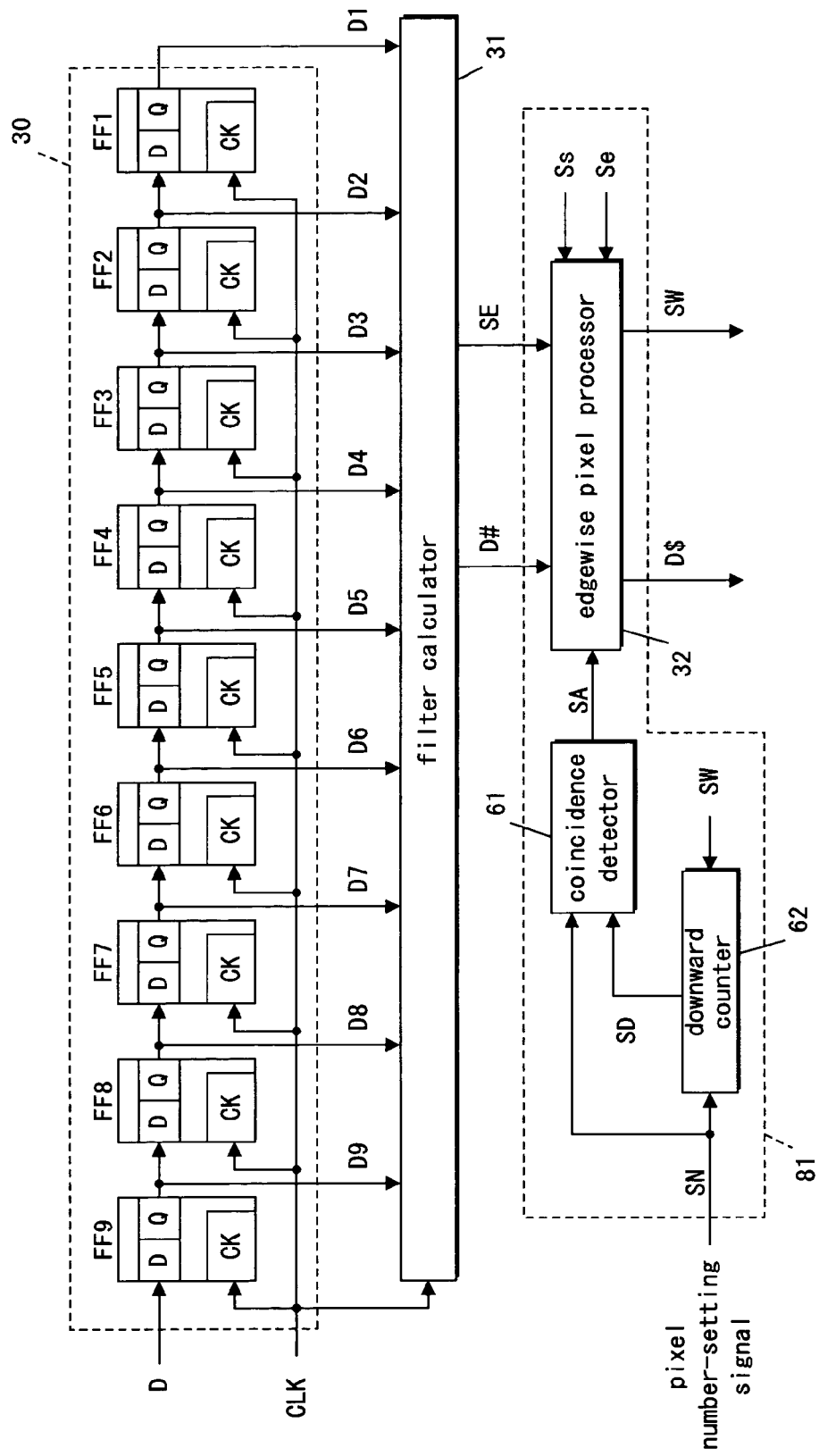
FIG. 19 is a block diagram illustrating a filtering circuit of an image processor according to a fourth embodiment.

FIG. 19 is a block diagram illustrating the filtering circuit 6. FIG. 19 illustrates the same reference characters on components similar to those described in FIG. 9.

As illustrated in FIG. 19, the filtering circuit 6 includes a data output control unit 81 that is substituted for the data output control unit 80 of FIG. 9.

The data output control unit 81 includes a down counter 62, a coincidence detector 61, and an edgewise pixel processor 32.

Pixel number-setting signal "SN" enters the down counter 62 and coincidence detector 61 in response to, e.g., instructions from the processor 1 before the filtering starts. As a result, the number of pixels for one line is set as initial value in the down counter 62 and coincidence detector 61.

The down counter 62 counts down each time when the edgewise pixel processor 32 feeds image data D$.

More specifically, the down counter 62 provides a countdown each time when the edgewise pixel processor 32 feeds write-indicating signal "SW" having a "H"-level into the down counter 62.

The down counter 62 feeds countdown signal "SD" into the coincidence detector 61. Countdown signal "SD" shows the number of count.

The coincidence detector 61 compares the number of pixels, set up by pixel number-setting signal "SN", with the number of count that is expressed by countdown signal "SD". When the number of pixels is coincident with the number of count, then the coincidence detector 61 feeds coincidence signal "SA" having a "H"-level into the edgewise pixel processor 32.

The coincidence detector 61 feeds coincidence signal "SA" having "H"-level into the edgewise pixel processor 32 when countdown signal "SD" names the number of count as "1".

As a result, coincidence signal "SA" having "H"-level is sent out only before the first and last image data "D$" are fed from the edgewise pixel processor 32.

The edgewise pixel processor 32 feeds the entered image data when coincidence signal "SA" having "H"-level enters the edgewise pixel processor 32, when coincidence signal "SA" having "L"-level, not filtering start signal "Ss", enters the edgewise pixel processor 32, and when coincidence signal "SA" having "L"-level, not filtering end signal "Se", enters the edgewise pixel processor 32.

The edgewise pixel processor 32 does not feed the entered image data when coincidence signal "SA" having "L"-level as well as filtering start signal "Ss" enters the edgewise pixel processor 32, and when coincidence signal "SA" having "L"-level as well as filtering end signal "Se" enters the edgewise pixel processor 32. Specific examples of the above are discussed later.

The edgewise pixel processor 32 feeds a write-indicating signal having "H"-level when coincidence signal "SA" having "H"-level enters the edgewise pixel processor 32, when coincidence signal "SA" having "L"-level, not filtering start signal "Ss", enters the edgewise pixel processor 32, and when coincidence signal "SA" having "L"-level, not filtering end signal "Se", enters the edgewise pixel processor 32.

The edgewise pixel processor 32 does not feed the write-indicating signal having "H"-level when coincidence signal "SA" having "L"-level as well as filtering start signal "Ss" enters the edgewise pixel processor 32, and when coincidence signal "SA" having "L"-level as well as filtering end signal "Se" enters the edgewise pixel processor 32. Specific examples of the above are discussed later.

Features of the filtering according to the present embodiment are now described in brief.

Figure 20:
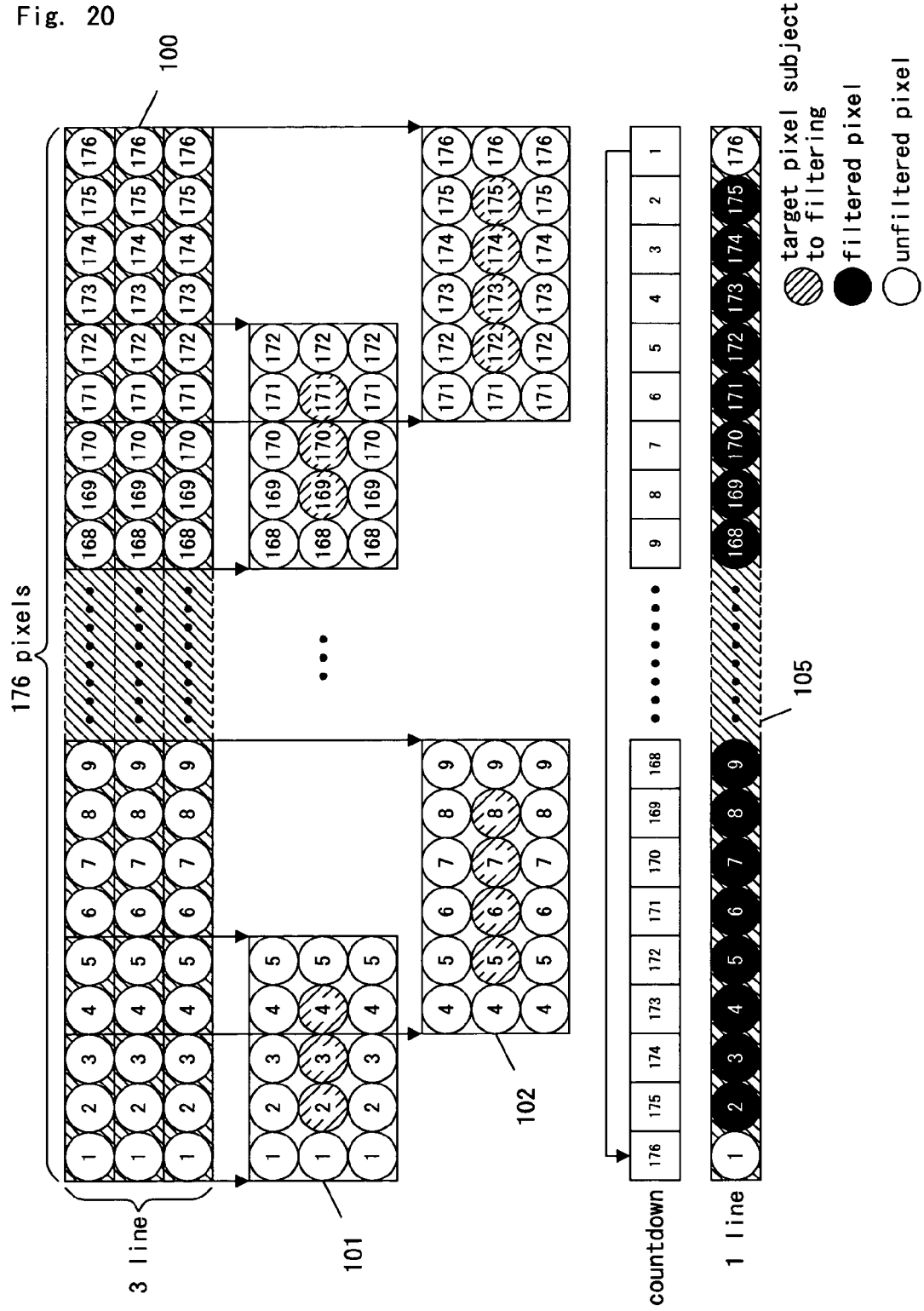
FIG. 20 is a schematic illustration showing how the image processor according to the fourth embodiment filters image data.

FIG. 20 is a schematic illustration showing how the image processor according to the present embodiment is operable to filter target image data subject to filtering.

FIG. 20 is similar in notation to FIG. 2.

As illustrated in FIG. 20, pursuant to the present embodiment, 176-pixels of one line are set in the down counter 62.

The down counter 62 counts downward by "1" every time when the edgewise pixel processor 32 feeds image data "D$".

The data output control unit 81 feeds only required image data "$" among the entered image data in accordance with information from the down counter 62.

In this way, the edgewise pixel-processing of 3-lines-by-176-pixels image data is achievable only by at first setting the number of pixels for one line into the down counter 62.

According to the second embodiment, mode information M is set up three times in order to perform the edgewise pixel-processing of 3-lines-by-176-pixels image data.

Details of the filtering are now discussed.

The following description presupposes that the source memory 10 of FIG. 1 is possible to store 3-lines-by-64-pixels image data at maximum.

Each gang of three-pixels-by-three-pixels image data is filtered. A pixel located at the center of three pixels-by-three pixels has target image data subject to filtering.

FIGS. 21(a), 21(b), and 21(c) are illustrations showing a flow of filtering steps. FIG. 21(a) is an illustration showing a flow of the first filtering. FIG. 21(b) is an illustration showing a flow of the second filtering. FIG. 21(c) is an illustration showing a flow of the third filtering.

FIGS. 21(a), 21(b), and 21(c) provide the same reference characters on components similar to those described in FIG. 1.

Figures 22A, 22B:
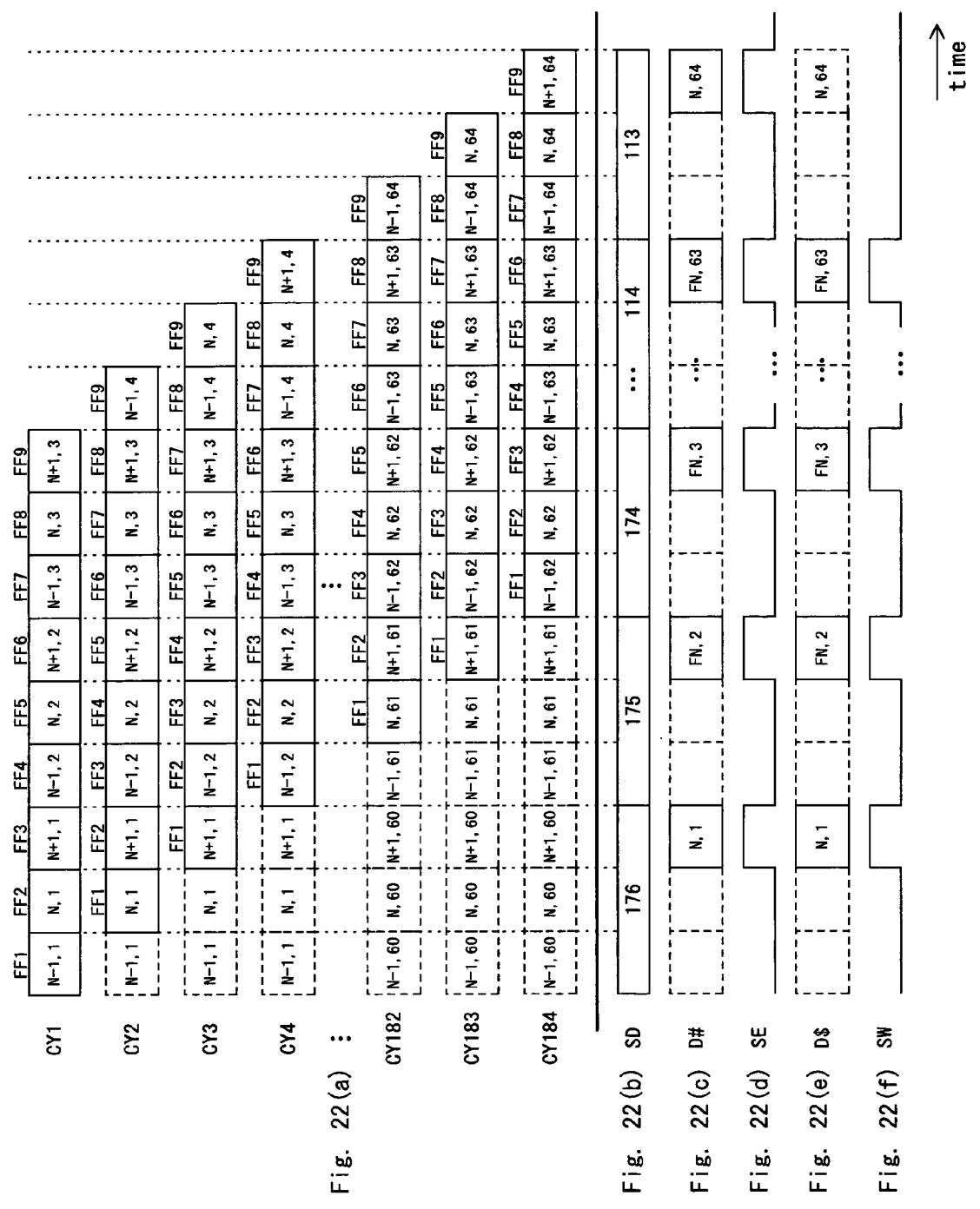

FIGS. 22(a), 22(b), 22(c), 22(d), 22(e), and 22(f) are time charts illustrating the first filtering. FIG. 22(a) is an illustration showing, for each cycle, image data sent to the filter calculator 31 of FIG. 19. FIG. 22(b) is an illustration showing the number of count provided by the down counter 62. FIG. 22(c) is an illustration showing image data fed from the filter calculator 31. FIG. 22(d) is an illustration showing an effective data-indicating signal from the filter calculator 31. FIG. 22(e) is an illustration showing image data written by a data write unit 121 to a destination memory 11. FIG. 22(f) is an illustration showing a write-indicating signal fed from the edgewise pixel processor 32.

FIGS. 23(a), 23(b), 23(c), 23(d), 23(e), and 23(f) are time charts illustrating the second filtering. FIG. 23(a) is an illustration showing, for each cycle, image data sent to the filter calculator 31. FIG. 23(b) is an illustration showing the number of count provided by the down counter 62. FIG. 23(c) is an illustration showing image data fed from the filter calculator 31. FIG. 23(d) is an illustration showing an effective data-indicating signal from the filter calculator 31. FIG. 23(e) is an illustration showing image data written by the data write unit 121 to the destination memory 11. FIG. 23(f) is an illustration showing a write-indicating signal from the edgewise pixel processor 32.

FIGS. 24(a), 24(b), 24(c), 24(d), 24(e), and 24(f) are time charts illustrating the third filtering. FIG. 24(a) is an illustration showing, for each cycle, image data sent to the filter calculator 31. FIG. 24(b) is an illustration showing the number of count provided by the down counter 62. FIG. 24(c) is an illustration showing image data fed from the filter calculator 31. FIG. 24(d) is an illustration showing an effective data-indicating signal from the filter calculator 31. FIG. 24(e) is an illustration showing image data written by the data write unit 121 to the destination memory 11. FIG. 24(f) is an illustration showing a write-indicating signal from the edgewise pixel processor 32.

The first filtering is now described with reference to FIG. 1, FIG. 19, FIG. 21(a), and FIGS. 22(a) to 22(f).

Steps taken until the filter calculator 31 feeds filtered image data "D#" and effective data-indicating signal "SE" are the same as those (see FIG. 5(a) to 5(c)) taken until the filter calculator 31 of FIG. 4 according to the first embodiment feeds filtered image data "D#" and effective data-indicating signal "SE".

As illustrated in FIG. 19, pixel number-setting signal "SN" sets "176"-pixels for one line into the down counter 62 and the coincidence detector 61 before the first filtering.

As shown in FIG. 22(b), the down counter 62 initially feeds countdown signal "SD" to the coincidence detector 61. Countdown signal "SD" expresses the number of count, "176".

At this time, the number of pixels, "176", set up by pixel number-setting signal "SN" is coincident with the number of count, "176", expressed by countdown signal "SD". As a result, the coincidence detector 61 feeds coincidence signal "SA" having "H"-level into the edgewise pixel processor 32.

As shown in FIG. 22(e) and 22(f), the edgewise pixel processor 32 in receipt of coincidence signal "SA" feeds image data (N, 1) from the filter calculator 31 and write-indicating signal "SW" having "H"-level.

The edgewise pixel processor 32 feeds write-indicating signal "SW" having "H"-level into the down counter 62.

The down counter 62 counts down by one from initial value "176". As illustrated in FIG. 22(b), the down counter 62 feeds countdown signal "SD" representative of the number of count, "175", into the coincidence detector 61.

At this time, the number of pixels, "176", set up by pixel number-setting signal "SN" does not coincide with the number of count, "175", expressed by countdown signal "SD". As a result, the coincidence detector 61 feeds coincidence signal "SA" having "L"-level.

As shown in FIG. 22(e) and 22(f), the edgewise pixel processor 32 feeds filtered image data (FN, 2) from the filter calculator 31 and write-indicating signal "SW" having "H"-level.

As illustrated in FIG. 22(f), the edgewise pixel processor 32 feeds write-indicating signal "SW" having "H"-level into the down counter 62.

Thereafter, the coincidence detector 61 continues to feed coincidence signal "SA" having "L"-level. As illustrated in FIG. 22(e), the edgewise pixel processor 32 feeds filtered image data (FN, 3) to (FN, 63) from the filter calculator 31 into the data write unit 121.

As illustrated in FIG. 22(f), the edgewise pixel processor 32 feeds write-indicating signal "SW" having "H"-level into the data write unit 121 while feeding the filtered image data (FN, 3) to (FN, 63) into the data write unit 121.

A data readout unit 120 feeds filtering end signal "Se" into the edgewise pixel processor 32 after the edgewise pixel processor 32 feeds filtered image data (FN, 63) into the data write unit 121.

As illustrated in FIG. 22(e), the edgewise pixel processor 32 in receipt of filtering end signal "Se" and coincidence signal "SA" having "L"-level does not feed the last image data (N, 64) from the filter calculator 31.

As illustrated in FIG. 22(f), the edgewise pixel processor 32 in receipt of filtering end signal "Se" and coincidence signal "SA" having "L"-level does not feed write-indicating signal "SW" having "H"-level.

As a result, the down counter 62 does not count down, and the number of count at the end of the first filtering is "113".

Consequently, as illustrated in FIG. 21(a), only the required image data (N, 1), (FN, 2) to (FN, 63), not the unnecessary image data (N, 64), are written to the destination memory 11.

The image data (N, 1), (FN, 2) to (FN, 63) written to the destination memory 11 are transferred to the image memory 2.

The second filtering is now discussed with reference to FIG. 1, FIG. 19, FIG. 21(b), and FIG. 23(a) to 23(f).

Steps taken until the filter calculator 31 feeds filtered image data "D#" and effective data-indicating signal "SE" are the same as those (see FIG. 6(a) to 6(c)) taken until the filter calculator 31 of FIG. 4 according to the first embodiment feeds filtered image data "D#" and effective data-indicating signal "SE". Therefore, descriptions related thereto are omitted.

As illustrated in FIGS. 23(c) and 23(d), the edgewise pixel processor 32 receives image data (N, 63), (FN, 64) to (FN, 125), and (N, 126) from the filter calculator 31 in accordance with effective data-indicating signal "SE".

At this time, the number of pixels, "176", set up by the pixel number-setting signal "SN" as illustrated in FIG. 23(b) does not coincide with the number of count shown by countdown signal "SD". The coincidence detector 61 feeds coincidence signal "SA" having "L"-level into the edgewise pixel processor 32.

In order to start the second filtering, the data readout unit 120 feeds filtering start signal "Ss" into the edgewise pixel processor 32.

As shown in FIG. 23(e), the edgewise pixel processor 32 in receipt of filtering start signal "Ss" and coincidence signal "SA" having "L"-level does not feed image data (N, 63) that is initially fed from the filter calculator 31 into the edgewise pixel processor 32.

As shown in FIG. 23(f), the edgewise pixel processor 32 in receipt of filtering start signal "Ss" and coincidence signal "SA" having "L"-level does not feed write-indicating signal "SW" having "H"-level.

As a result, the down counter 62 performs no countdown. At this time, the number of count is still "113", as shown in FIG. 23(b).

Thereafter, coincidence signal "SA" having "L"-level, not filtering start signal "Ss", enters the edgewise pixel processor 32. As illustrated in FIG. 23(e), the edgewise pixel processor 32 feeds filtered image data (FN, 64) to (FN, 125) from the filter calculator 31.

As shown in FIG. 23(f), the edgewise pixel processor 32 feeds write-indicating signal "SW" having "H"-level to the data write unit 121 while feeding the filtered image data (FN, 64) to (FN, 125) into the data write unit 121.

The data readout unit 120 feeds filtering end signal "Se" into the edgewise pixel processor 32 after the edgewise pixel processor 32 feeds the filtered image data (FN, 125), as shown in FIG. 23(e).

As illustrated in FIG. 23(e), the edgewise pixel processor 32 in receipt of filtering end signal "Se" and coincidence signal "SA" having "L"-level does not feed image data (N, 126) that is the last image data fed from the filter calculator 31.

As illustrated in FIG. 23(f), the edgewise pixel processor 32 in receipt of filtering end signal "Se" and coincidence signal "SA" having "L"-level does not feed write-indicating signal "SW" having "H"-level.

As a result, the down counter 62 performs no countdown, and the number of count at the end of the second filtering is "51".

Consequently, as illustrated in FIG. 21(b), only the required image data (FN, 64) to (FN, 125), not the unnecessary image data (N, 63) and (N, 126), are written to the destination memory 11, The image data (FN, 64) to (FN, 125) written to the destination memory 11 are transmitted to the image memory 2.

The third filtering is now discussed with reference to FIG. 1, FIG. 19, FIG. 21(c), and FIG. 24(a) to 24(f).

Steps taken until the filter calculator 31 feeds filtered image data "D#" and effective data-indicating signal "SE" are the same as those (see FIG. 7(a) to 7(c)) taken until the filter calculator 31 of FIG. 4 according to the first embodiment feeds filtered image data "D#" and effective data-indicating signal "SE". Therefore, descriptions related thereto are omitted.

As illustrated in FIGS. 24(c) and 24(d), the edgewise pixel processor 32 receives image data (N, 125), (FN, 126) to (FN, 175), and (N, 176) from the filter calculator 31 in accordance with effective data-indicating signal "SE".

At this time, the number of pixels, "176", set up by the pixel number-setting signal "SN" as illustrated in FIG. 24(b) does not coincide with the number of count shown by countdown signal "SD". The coincidence detector 61 feeds coincidence signal "SA" having "L"-level to the edgewise pixel processor 32.

In order to start the third filtering, the data readout unit 120 feeds filtering start signal "Ss" to the edgewise pixel processor 32.

As shown in FIG. 24(e), the edgewise pixel processor 32 in receipt of filtering start signal "Ss" and coincidence signal "SA" having "L"-level does not feed image data (N, 125) that is the first image data fed into the edgewise pixel processor 32 from the filter calculator 31.

As shown in FIG. 24(f), the edgewise pixel processor 32 in receipt of filtering start signal "Ss" and coincidence signal "SA" having "L"-level does not feed write-indicating signal "SW" having "H"-level.

As a result, the down counter 62 performs no countdown. At this time, the number of count is still "51", as shown in FIG. 24(b).

Thereafter, coincidence signal "SA" having "L"-level, not filtering start signal "Ss", enters the edgewise pixel processor 32. As illustrated in FIG. 24(e), the edgewise pixel processor 32 feeds filtered image data (FN, 126) to (FN, 175) from the filter calculator 31.

As shown in FIG. 24(f), the edgewise pixel processor 32 feeds write-indicating signal "SW" having "H"-level to the data write unit 121 while feeding the filtered image data (FN, 126) to (FN, 175) into the data write unit 121.

The down counter 62 provides the number of count, "1", after the edgewise pixel processor 32 feeds filtered image data (FN, 175), as shown in FIG. 24(b).

As a result, countdown signal "SD" representative of the number of count, "1", enters the coincidence detector 61. The coincidence detector 61 feeds coincidence signal "SA" having "H"-level to the edgewise pixel processor 32.

As illustrated in FIG. 24(e), the edgewise pixel processor 32 in receipt of coincidence signal "SA" having "H"-level feeds image data (N, 126) that is the last image data coming from the filter calculator 31 to the edgewise pixel processor 32.

As illustrated in FIG. 24(f), the edgewise pixel processor 32 in receipt of coincidence signal "SA" having "H"-level feeds write-indicating signal "SW" having "H"-level.

Consequently, as illustrated in FIG. 21(c), only the required image data (FN, 126) to (FN, 175), and (N, 176), not the unnecessary image data (N, 125), are written to the destination memory 11.

The image data (FN, 126) to (FN, 175), and (N, 176) written to the destination memory 11 are transmitted to the image memory 2.

As described above, the image processor according to the present embodiment is possible to prepare line data in a reduced time because a gang of filtered image data is free of unnecessary image data (N, 64), (N, 63), (N, 126), and (N, 125), which are produced in the course of filtering the target image data subject to filtering.

The image processor according to the present embodiment initially sets up the number of pixels to be filtered.

Such a simple setup provides subsequent edgewise pixel processing. This feature make it feasible to set up edgewise pixel-processing information at a smaller number of times.

The image processor according to the present embodiment includes the construction of that according to the first embodiment. Therefore, the image processor according to the present embodiment provides beneficial effects similar to those obtained in the first embodiment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image processor comprising:
    a first storage unit operable to store separated image data formed by several pieces of pixel data, the separated image data having a predetermined width and being separated from lines of image data;
    a data readout unit operable to sequentially read out the several pieces of pixel data stored by said first storage unit;
    a filtering unit operable to filter target pixel data subject to filtering using predetermined pieces of the pixel data that are read out from said data readout unit, thereby outputting filtered pixel data and non-filtered pixel data, the predetermined pieces of the pixel data including the target pixel data subject to filtering and non-target pixel data subject to filtering;
    a second storage unit operable to store the filtered pixel data and the non-filtered pixel data;
    a setting unit operable to set a mode signal indicating whether or not the non-filtered pixel data is to be fed; and
    a data output control unit operable to control feeding of the non-filtered pixel data according to the mode signal, wherein
    said first storage unit has a same width as the predetermined width,
    the lines of image data have a same width as a line of display, and
    the non-filtered pixel data is generated by the non-target pixel data subject to filtering.

2. An image processor as defined in claim 1, wherein the mode signal divides the non-filtered pixel data into first non-filtered pixel data to be fed and second non-filtered pixel data not to be fed.

3. An image processor as defined in claim 1, wherein said data output control unit is operable to feed the filtered pixel data and the non-filtered pixel data according to a timing generated by countdown from an initial value.

4. An image processor as defined in claim 1, wherein said filtering unit comprises an image data-retaining unit operable to retain a number of pieces of pixel data to be used in a next filtering operation, the number of pieces of pixel data to be used in the next filtering operation being selected from among the several pieces of pixel data read out by said data readout unit from said first storage unit.

5. An image processor as defined in claim 1, wherein the predetermined width is less than the width of the line of display.

* * * * *